(12) United States Patent
Kato

(10) Patent No.: US 9,744,859 B2
(45) Date of Patent: Aug. 29, 2017

(54) ELECTRICALLY POWERED VEHICLE

(71) Applicant: TOYOTA JIDOSHA KABUSHIKI KAISHA, Toyota-shi, Aichi (JP)

(72) Inventor: Shunya Kato, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 90 days.

(21) Appl. No.: 14/798,992

(22) Filed: Jul. 14, 2015

(65) Prior Publication Data
US 2016/0039288 A1 Feb. 11, 2016

(30) Foreign Application Priority Data
Aug. 8, 2014 (JP) .................. 2014-162432

(51) Int. Cl.
| | | |
|---|---|---|
| *B60L 3/00* | (2006.01) | |
| *B60W 20/00* | (2016.01) | |
| *B60L 15/20* | (2006.01) | |
| *B60W 20/50* | (2016.01) | |
| *B60W 30/184* | (2012.01) | |
| *B60W 20/13* | (2016.01) | |

(52) U.S. Cl.
CPC .......... *B60L 3/0046* (2013.01); *B60L 3/0061* (2013.01); *B60L 15/2054* (2013.01); *B60W 20/13* (2016.01); *B60W 20/50* (2013.01); *B60W 30/184* (2013.01); *B60W 2510/246* (2013.01); *B60W 2540/10* (2013.01); *B60W 2710/085* (2013.01); *B60W 2710/1005* (2013.01); *Y02T 10/7258* (2013.01); *Y10S 903/903* (2013.01)

(58) Field of Classification Search
CPC .. B60L 3/0046; B60L 3/0061; B60L 15/2054; B60W 30/184; B60W 20/13; B60W 20/50; B60W 2540/10; B60W 2710/085; B60W 2710/1005; B60W 2510/246; Y02T 10/7258; Y10S 903/903
See application file for complete search history.

(56) References Cited

U.S. PATENT DOCUMENTS

| | | |
|---|---|---|
| 2006/0224360 A1 | 10/2006 | Kishimoto |
| 2007/0107956 A1 | 5/2007 | Matsubara et al. |
| 2008/0300099 A1 | 12/2008 | Yamamoto et al. |
| 2010/0310953 A1 | 12/2010 | Yumiya |

(Continued)

FOREIGN PATENT DOCUMENTS

| | | |
|---|---|---|
| DE | 10 2006 000 144 A1 | 10/2006 |
| DE | 602 20 987 T2 | 10/2007 |
| DE | 11 2005 003 292 T5 | 4/2008 |

(Continued)

*Primary Examiner* — Anne M Antonucci
(74) *Attorney, Agent, or Firm* — Finnegan, Henderson, Farabow, Garrett & Dunner, LLP

(57) ABSTRACT

A hybrid vehicle includes a differential portion including a motor generator, an electric power storage device exchanging electric power with the motor generator included in the differential portion, a gear type transmission provided in a powertrain between a rotation shaft of the motor generator and a drive wheel, and a control device controlling torque of the motor generator during gear shifting in the transmission. A restriction value for a rate of change in torque of the motor generator while a temperature of the electric power storage device is low is smaller than the restriction value while the temperature of the electric power storage device is high.

10 Claims, 20 Drawing Sheets

(56) References Cited

U.S. PATENT DOCUMENTS

2013/0079966 A1  3/2013  Terakawa et al.
2015/0336468 A1  11/2015  Sugiyama

FOREIGN PATENT DOCUMENTS

| DE | 11 2007 002 656 T5 | 10/2009 |
| DE | 11 2012 007 254 T5 | 10/2015 |
| EP | 1 356 972 B1 | 7/2007 |
| JP | 2007-112349 | 5/2007 |
| JP | 2013-071551 A | 4/2013 |

|  | C1 | C2 | C3 | B1 | B2 | F1 |
|---|---|---|---|---|---|---|
| 1st | ○ |  |  |  | (○) | △ |
| 2nd | ○ |  |  | ○ |  |  |
| 3rd | ○ | ○ |  |  |  |  |
| 4th |  | ○ |  | ○ |  |  |
| R |  |  | ○ |  | ○ |  |
| N |  |  |  |  |  |  |

○ : ENGAGED
(○): ENGAGED DURING ENGINE BRAKE
△ : ENGAGED ONLY DURING DRIVE

FIG.13

|  |  | TEMPERATURE TB OF ELECTRIC POWER STORAGE DEVICE | |
|---|---|---|---|
|  |  | LOW | HIGH |
| DEGREE OF PROGRESS OF GEAR SHIFTING | SMALL | tlim1 | tlim_max |
|  | LARGE | tlim2 | tlim_max | tlim1 : RESTRICTION VALUE FOR RATE OF CHANGE IN MG TORQUE IN ACCORDANCE WITH TEMPERATURE TB OF ELECTRIC POWER STORAGE DEVICE tlim2 : RESTRICTION VALUE FOR RATE OF CHANGE IN MG TORQUE IN ACCORDANCE WITH DEGREE OF PROGRESS OF GEAR SHIFTING tlim_max : MAXIMUM VALUE FOR RESTRICTION VALUE FOR RATE OF CHANGE IN MG TORQUE

FIG.16

|  |  | VEHICLE SPEED | |
|---|---|---|---|
|  |  | LOW | HIGH |
| ACCELERATOR OPENING | SMALL | tlim2 | tlim1 |
|  | LARGE | tlim1 | tlim1 | tlim1 : RESTRICTION VALUE FOR RATE OF CHANGE IN
MG TORQUE IN ACCORDANCE WITH TEMPERATURE
TB OF ELECTRIC POWER STORAGE DEVICE tlim2 : RESTRICTION VALUE FOR RATE OF CHANGE IN
MG TORQUE IN ACCORDANCE WITH DEGREE OF
PROGRESS OF GEAR SHIFTING

FIG.23

|  |  | VEHICLE SPEED | |
|---|---|---|---|
|  |  | LOW | HIGH |
| ACCELERATOR OPENING | SMALL | plim2 | plim3 |
|  | LARGE | plim1 | plim1 | plim1 : RESTRICTION VALUE FOR RATE OF CHANGE IN MG POWER IN ACCORDANCE WITH TEMPERATURE TB AND VOLTAGE VH plim2 : RESTRICTION VALUE FOR RATE OF CHANGE IN MG POWER IN ACCORDANCE WITH DEGREE OF PROGRESS OF GEAR SHIFTING plim3 : RESTRICTION VALUE FOR RATE OF CHANGE IN MG POWER IN ACCORDANCE WITH TEMPERATURE TB

FIG.24

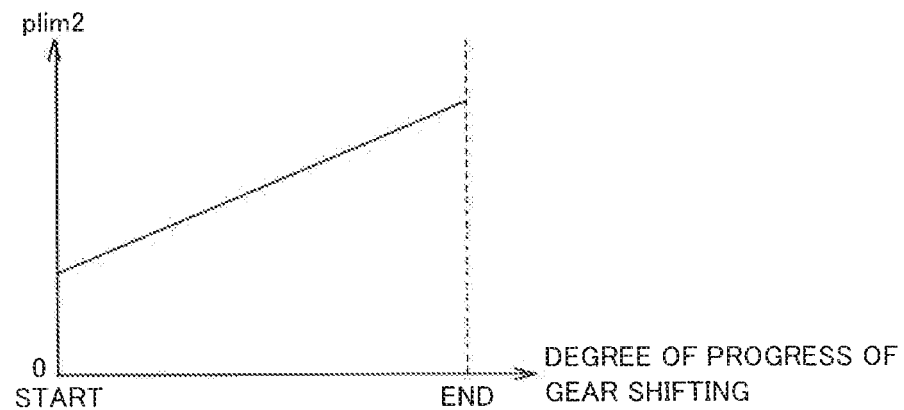

ELECTRICALLY POWERED VEHICLE

This nonprovisional application is based on Japanese Patent Application No. 2014-162432 filed with the Japan Patent Office on Aug. 8, 2014, the entire contents of which are hereby incorporated by reference.

BACKGROUND OF THE INVENTION

Field of the Invention

This invention relates to an electrically powered vehicle, and particularly to an electrically powered vehicle including a gear type transmission in an electric power transmission path between a rotation shaft of a motor and drive wheels.

Description of the Background Art

Japanese Patent Laying-Open No. 2007-112349 discloses a hybrid power unit distributing output from an internal combustion engine to a generator and a rotation output shaft and transmitting output from a motor to the rotation output shaft through a transmission. In this hybrid power unit, shift shock is lessened by reducing torque of the motor during gear shifting in the transmission and an amount of generation of electric power by the generator is decreased by reducing torque of the generator in order to hold power balance of a battery.

According to this hybrid power unit, since output from the internal combustion engine is not lowered during gear shifting in the transmission, shift shock can appropriately be lessened without generating response delay in output rotation (see Japanese Patent Laying-Open No 2007-112349).

During gear shifting in a gear type transmission, change in rotation of an input shaft of the transmission is abrupt, and in order to shift a gear with shift shock being suppressed, output (torque and power) from a motor coupled to the input shaft of the transmission should suddenly be changed. Basically, the motor is controlled such that electric power input to and output from an electric power storage device such as a battery does not exceed an allowable value (allowable output electric power Wout and allowable input electric power Win), however, electric power input to and output from the electric power storage device may exceed the allowable value due to delay in a control system. Namely, due to delay caused by communication or delay caused by filtering processing, delay in effectuation of a calculated instruction actually takes place, and electric power input to and output from the electric power storage device may exceed the allowable value under the influence of this delay in effectuation. Such delay in effectuation always takes place regardless of whether or not a gear is being shifted, however, it becomes noticeable when it affects excess of electric power input to and output from the electric power storage device during gear shilling in which output from the motor is suddenly changed. Excess of electric power input to and output from the electric power storage device over an allowable value leads to deterioration of the electric power storage device.

In a case that a voltage converter is provided between a drive device such as an inverter driving a motor and an electric power storage device, when power of the motor is changed, electric power is input to and output from a capacitor provided between the voltage converter and the drive device. In order to suppress fluctuation in voltage of the capacitor caused by input and output of electric power, the voltage converter is actuated and electric power is input to and output from the electric power storage device. Here, when power of the motor is suddenly changed in order to shift the gear with shift shock being suppressed, for example, during gear shifting, electric power input to and output from the capacitor increases, and consequently, electric power input to and output from the electric power storage device may exceed an allowable value. As set forth above, such excess leads to deterioration of the electric power storage device.

SUMMARY OF THE INVENTION

Therefore, an object of this invention is to achieve both of lessening of shift shock and suppression of deterioration of an electric power storage device in an electrically powered vehicle including a gear type transmission in an electric power transmission path between a rotation shaft of a motor and drive wheels.

According to this invention, an electrically powered vehicle includes a motor, an electric power storage device exchanging electric power with the motor, a gear type transmission provided in a powertrain between a rotation shaft of the motor and a drive wheel, and a control device controlling torque of the motor during gear shifting in the transmission. A restriction value for a rate of change in torque while a temperature of the electric power storage device is low is smaller than a restriction value for the rate of change in torque while a temperature of the electric power storage device is high.

In this electrically powered vehicle, since the restriction value for the rate of change in torque while the temperature of the electric power storage device is low is smaller than the restriction value for the rate of change in torque while the temperature of the electric power storage device is high, electric power input to and output from the electric power storage device is suppressed at a low temperature at which an allowable value of the electric power input to and output from the electric power storage device is small. Since restriction of the rate of change in torque of the motor is relaxed unless the electric power storage device is at a low temperature, sudden change in torque of the motor is allowed and shift shock can be lessened. Therefore, according to this electrically powered vehicle, suppression of deterioration of the electric power storage device and lessening of shift shock can be achieved.

According to this invention, an electrically powered vehicle includes a motor, an electric power storage device exchanging electric power with the motor, a gear type transmission provided in a powertrain between a rotation shaft of the motor and a drive wheel, and a control device controlling torque of the motor during gear shifting in the transmission. A restriction value for a rate of change in torque in a latter half of gear shifting in the transmission is greater than a restriction value for the rate of change in torque in a first half of gear shifting in the transmission.

In a gear type transmission, in general, great shift shock takes place in the latter half of gear shifting in the transmission. In this electrically powered vehicle, since the restriction value for the rate of change in torque in the latter half of gear shifting is greater than the restriction value for the rate of change in torque in the first half of gear shifting, in the latter half of gear shifting in which shift shock is likely to occur, sudden change in torque of the motor is allowed and shift shock can be lessened. In the first half of gear shifting, since the restriction value for the rate of change in torque of the motor is small, electric power input to and output from the electric power storage device is suppressed and deterioration of the electric power storage device is suppressed. Therefore, according to this electrically powered vehicle, lessening of shift shock and suppression of deterioration of the electric power storage device can both be achieved.

According to this invention, an electrically powered vehicle includes a motor, an electric power storage device exchanging electric power with the motor, a gear type transmission provided in a powertrain between a rotation shaft of the motor and a drive wheel, and a control device controlling torque of the motor during gear shifting in the transmission. First restriction and second restriction are provided for a rate of change in torque of the motor. For the first restriction, a restriction value for the rate of change in torque while a temperature of the electric power storage device is low is smaller than a restriction value for the rate of change in torque while a temperature of the electric power storage device is high. For the second restriction, a restriction value for the rate of change in torque in a latter half of gear shifting in the transmission is greater than a restriction value for the rate of change in torque in a first half of gear shifting. The first restriction is employed for the rate of change in torque of the motor when the temperature of the electric power storage device is lower than a prescribed temperature and when gear shifting in the transmission is in the first half of gear shifting. The second restriction is employed for the rate of change in torque of the motor when the temperature of the electric power storage device is lower than the prescribed temperature and when gear shifting in the transmission is in the latter half of gear shifting.

In this electrically powered vehicle, while a temperature of the electric power storage device is low, first restriction is employed for the rate of change in torque of the motor in the first half of gear shifting in the transmission. Thus, electric power input to and output from the electric power storage device is suppressed and deterioration of the electric power storage device is suppressed. In the latter half of gear shifting, second restriction is employed for the rate of change in torque of the motor. Thus, in the latter half of gear shifting in which great shift shock may take place, with priority being placed on lessening of shill shock, sudden change in torque of the motor is allowed and shift shock is lessened. Therefore, according to this electrically powered vehicle lessening of shift shock and suppression of deterioration of the electric power storage device can both be achieved.

Preferably, while the temperature of the electric power storage device is lower than the prescribed temperature and while gear shifting in the transmission is in the latter half of gear shifting, when a vehicle speed is lower than a prescribed speed and when an accelerator opening is smaller than a prescribed amount, the second restriction is employed for the rate of change in torque of the motor, and when a vehicle speed is higher than the prescribed speed or when an accelerator opening is greater than the prescribed amount, the first restriction is employed for the rate of change in torque of the motor.

Shift shock is likely to be sensed by a user when a vehicle speed is low and an accelerator opening is small, and can be allowed when a vehicle speed is high or an accelerator opening is large. Then, in this electrically powered vehicle, in a case that a temperature of the electric power storage device is low and when gear shifting in the transmission is in the latter half of gear shifting, when a vehicle speed is high or an accelerator opening is large, first restriction is employed for the rate of change in torque of the motor so as to suppress deterioration of the electric power storage device. Therefore, according to this electrically powered vehicle, suppression of deterioration of the electric power storage device can be reinforced.

Preferably, in a case that the first restriction is employed for the rate of change in torque of the motor when the temperature of the electric power storage device is lower than the prescribed temperature and when gear shifting in the transmission is in the first half of gear shifting, the first restriction is provided such that the restriction value for the rate of change in torque while a rate of change in rotation speed of the motor is high is greater than the restriction value for the rate of change in torque when a rate of change in rotation speed is low.

When a rate of change in rotation speed of the motor is high, in order to manage power in accordance with change in rotation speed, torque of the motor should abruptly be changed. In this electrically powered vehicle, even though first restriction is employed for the rate of change in torque of the motor, sudden change in torque of the motor is allowed when the rate of change in rotation speed of the motor is high. Therefore, according to this electrically powered vehicle, appropriate power management in accordance with change in rotation speed can be carried out.

According to this invention, an electrically powered vehicle includes a motor, an electric power storage device exchanging electric power with the motor, a gear type transmission provided in a powertrain between a rotation shaft of the motor and a drive wheel, and a control device controlling power of the motor. A restriction value for a rate of change in power of the motor while a temperature of the electric power storage device is low is smaller than a restriction value for the rate of change in power while a temperature of the electric power storage device is high.

In this electrically powered vehicle, since the restriction value for the rate of change in power while a temperature of the electric power storage device is low is smaller than the restriction value for a rate of change in power while a temperature of the electric power storage device is high, electric power input to and output from the electric power storage device is suppressed at a low temperature at which an allowable value for electric power input to and output from the electric power storage device is small. Since restriction of the Fate of change in power of the motor is relaxed unless the electric power storage device is at a low temperature, sudden change in power of the motor is allowed and shift shock can be lessened. Therefore, according to this electrically powered vehicle, suppression of deterioration of the electric power storage device and lessening of shift shock can be achieved.

According to this invention, an electrically powered vehicle includes a motor, a gear type transmission provided in a powertrain between a rotation shaft of the motor and a drive wheel, a drive device driving the motor, an electric power storage device, a voltage converter provided between the drive device and the electric power storage device, a capacitor provided between the voltage converter and the drive device, and a control device controlling power of the motor and controlling a voltage of the capacitor. A restriction value for a rate of change in power of the motor while a voltage of the capacitor is high is smaller than a restriction value for the rate of change in power while a voltage of the capacitor is low.

When a voltage of a capacitor is high electric power input to and output from the capacitor and electric power input to and output from the electric power storage device can be high. In this electrically powered vehicle, since the restriction value for the rate of change in power of the motor while a voltage of the capacitor is high is smaller than the restriction value for the rate of change in power while a voltage of the capacitor is low, electric power input to and output from the capacitor and the electric power input to and output from the electric power storage device are suppressed while a voltage of the capacitor is high. Since restriction of the rate of change in power of the motor is relaxed while a voltage of the capacitor is low, sudden change in power of the motor is allowed and shift shock can be lessened, for example, during gear shifting. Therefore, according to this electrically powered vehicle, suppression of deterioration of the electric power storage device and lessening of shift shock can be achieved.

Preferably, regarding the restriction value for the rate of change in power of the motor, the restriction value for the rate of change in power while a temperature of the electric power storage device is low is smaller than the restriction value for the rate of change in power while a temperature of the electric power storage device is high.

Thus, suppression of deterioration of the electric power storage device can be reinforced.

Preferably, first to third restrictions are provided for the rate of change in power of the motor. For the first restriction, the restriction value for the rate of change in power while a temperature of the electric power storage device is low is smaller than the restriction value for the rate of change in power while a temperature of the electric power storage device is high. For the second restriction, as compared with the first restriction, additionally, the restriction value for the rate of change in power while a voltage of the capacitor is high is smaller than the restriction value for the rate of change in power while a voltage of the capacitor is low. For the third restriction, the restriction value for the rate of change in power in a latter half of gear shifting in the transmission is greater than the restriction value for the rate of change in power in a first half of gear shifting. The second restriction is employed for the rate of change in power of the motor when an accelerator opening is greater than a prescribed amount. The third restriction is employed for the rate of change in power of the motor when the accelerator opening is smaller than the prescribed amount and when a vehicle speed is lower than a prescribed speed. The first restriction is employed for the rate of change in power of the motor when the accelerator opening is smaller than the prescribed amount and when the vehicle speed is higher than the prescribed speed.

In this electrically powered vehicle, since power of the motor is high and a voltage of the capacitor is also accordingly high when an accelerator opening is large, second restriction in accordance with the voltage of the capacitor is employed. Since shift shock is likely to be sensed by a user when an accelerator opening is small and a vehicle speed is low, third restriction in accordance with a degree of progress of gear shifting is employed. Since power of the motor is not so high and shift shock can also be allowed when an accelerator opening is small and a vehicle speed is high, first restriction in accordance with a temperature of the electric power storage device is employed. Therefore, according to this electrically powered vehicle, lessening of shift shock and suppression of deterioration of the electric power storage device can both be achieved.

Preferably, for each of the first to third restrictions, the restriction value is determined such that the restriction value for the rate of change in power while a difference between a rotation speed of the motor at the start of gear shifting in the transmission and the rotation speed at the end of gear shifting in the transmission is great is smaller than the restriction value for the rate of change in power while the difference in rotation speed is small.

When a difference in rotation speed of the motor between before and after gear shifting is large, change in power of the motor is abrupt and fluctuation in voltage of the capacitor is likely. In this electrically powered vehicle, when a difference in rotation speed of the motor between before and after gear shifting is large, the restriction value for the rate of change in power is made smaller so as to suppress abrupt power change in motor. Thus, fluctuation in voltage of the capacitor is suppressed and electric power input to and output from the electric power storage device is suppressed. Therefore, according to this electrically powered vehicle, suppression of deterioration of the electric power storage device can be reinforced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing a restriction value for a rate of change in torque of a motor generator in a third embodiment.

FIG. 16 is a diagram showing a restriction value for a rate of change in torque of the motor generator when a temperature of an electric power storage device is low and a degree of progress of gear shifting is large in a fourth embodiment.

FIG. 23 is a diagram showing a restriction value for a rate of change in power of the motor generator in a sixth embodiment.

FIG. 24 is a diagram showing relation between a degree of progress of gear shifting and a restriction value for a rate of change in power of the motor generator.

DESCRIPTION OF THE PREFERRED EMBODIMENTS

Figure 1:
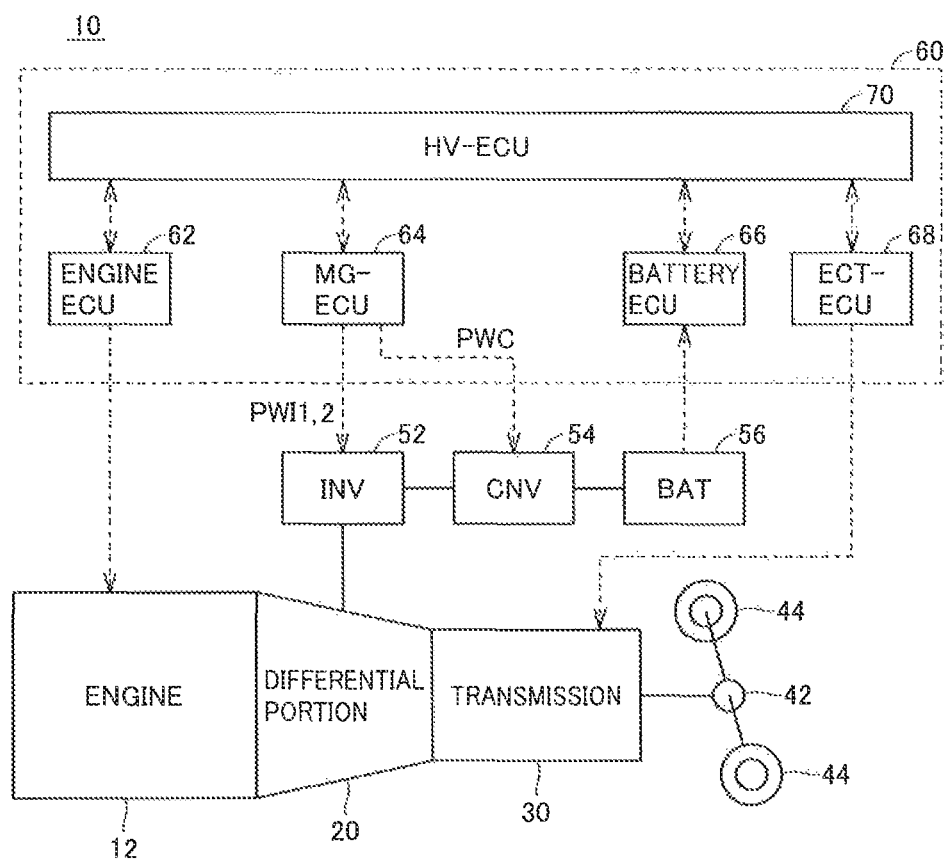
FIG. 1 is a diagram showing an overall configuration of a hybrid vehicle shown as one example of an electrically powered vehicle according to the present embodiment.

An embodiment of the present invention will be described hereinafter in detail with reference to the drawings. The same or corresponding elements in the drawings have the same reference characters allotted and description thereof will not be repeated.

[Description of Electrically Powered Vehicle]
(Overall Configuration of Vehicle)

FIG. 1 is a diagram showing an overall configuration of a hybrid vehicle 10 shown as one example of an electrically powered vehicle according to the present embodiment. Referring to FIG. 1, hybrid vehicle 10 includes an engine 12, a differential portion 20, a transmission 30, a differential gear 42, and a drive wheel 44. Hybrid vehicle 10 further includes an inverter 52, a converter 54, an electric power storage device 56, and a control device 60.

Engine 12 is an internal combustion engine outputting motive power by converting thermal energy resulting from combustion of a fuel into kinetic energy of such a motion element as a piston or a rotor. Differential portion 20 is coupled to engine 12. Differential portion 20 includes a motor generator driven by inverter 52 and a power split device dividing output from engine 12 to a transmission member to transmission 30 and the motor generator. A configuration of differential portion 20 will be described later.

Transmission 30 is coupled to differential portion 20 and configured to be able to change a ratio (a gear ratio) between a rotation speed of the transmission member (an input shaft of transmission 30) connected to differential portion 20 and a rotation speed of a driveshaft (an output shaft of transmission 30) connected to differential gear 42. Transmission 30 is implemented by a gear type transmission of which gear ratio can be changed in a stepwise manner, and it is implemented by an automatic transmission including a plurality of friction elements (a clutch and a brake) in the present embodiment. Differential gear 42 is coupled to the output shaft of transmission 30 and transmits motive power output from transmission 30 to drive wheel 44. A configuration of transmission 30 will also be described later, together with differential portion 20.

Inverter 52 is controlled by control device 60 and drives the motor generator included in differential portion 20. Inverter 52 is implemented, for example, by a bridge circuit including power semiconductor switching elements of three phases.

Converter 54 is electrically connected between inverter 52 and electric power storage device 56. Converter 54 is controlled by control device 60 and regulates a voltage supplied to inverter 52. Specifically, converter 54 boosts a voltage supplied to inverter 52 to a voltage equal to or higher than a voltage of electric power storage device 56. Converter 54 is implemented, for example, by a current-reversible boost chopper circuit.

Electric power storage device 56 is a rechargeable direct-current power supply, and it is implemented representatively by such a secondary battery as a lithium ion battery or a nickel metal hydride battery. Electric power storage device 56 may be implemented by such an electric power storage element as an electric double layer capacitor, instead of a secondary battery.

Control device 60 includes an engine electronic control unit (ECU) 62, an MG-ECU 64, a battery ECU 66, an ECT-ECUS 68, and an HV-ECU 70. Each of such ECUs includes a central processing unit (CPU), a storage device, and an input and output buffer (none of which is shown), and carries out prescribed control. Control carried out by each ECU is not limited to processing by software but can also be processed by dedicated hardware (en electronic circuit).

Engine ECU 62 generates a throttle signal or an ignition signal for driving engine 12 based on an engine torque instruction received from HV-ECU 70 and outputs each generated signal to engine 12.

MG-ECU 64 generates a control signal for driving inverter 52 based on a torque instruction for the motor generator included in differential portion 20, which is received from HV-ECU 70, and outputs the generated control signal to inverter 52. MG-ECU 64 generates a control signal for driving converter 54 based on a voltage instruction indicating a target voltage (a target value for an input voltage of inverter 52), which is received from HV-ECU 70, and outputs the generated control signal to converter 54.

Battery ECU 66 estimates a charged state of electric power storage device 56 (indicated by an SOC value representing in percentage, a current amount of electric power storage with respect to a fully charged state) based on a voltage and/or a current of electric power storage device 56, and outputs the estimated value to HV-ECU 70. ECT-ECU 68 generates a hydraulic instruction for controlling transmission 30 based on a torque capacity instruction received from HV-ECU 70 and outputs the generated hydraulic instruction to transmission 30.

HV-ECU 70 receives detection signals from various sensors and generates various instructions for controlling each device of hybrid vehicle 10. Mainly, HV-ECU 70 generates various instructions for controlling engine 12 and differential portion 20 to a desired state of running, based on an amount of operation of an accelerator pedal or on a vehicle speed. HV-ECU 70 generates various instructions for controlling transmission 30 to a desired state of gear shifting.

During gear shifting in transmission 30, in order that differential portion 20 coupled to transmission 30 does not interfere gear shifting in transmission 30 and further in order that gear shifting in transmission 30 is smoothly carried out by differential portion 20, HV-ECU 70 controls torque of the motor generator (which will be described later) included in differential portion 20 during gear shifting in transmission 30.

Figure 2:
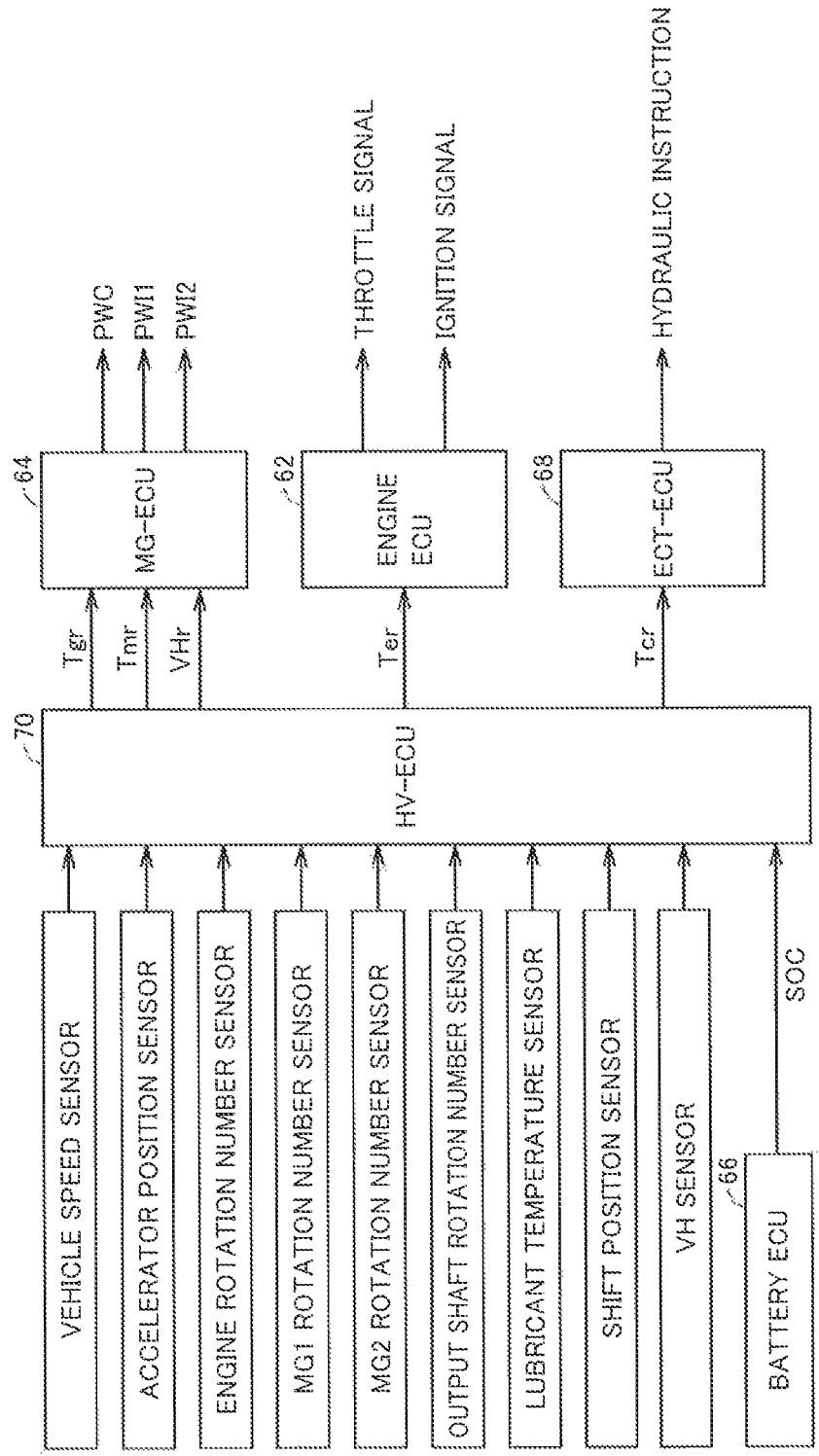
FIG. 2 is a diagram showing main signals and instructions input to and output from a control device shown in FIG. 1.

FIG. 2 is a diagram showing main signals and instructions input to and output from control device 60 shown in FIG. 1. Referring to FIG. 2, HV-ECU 70 receives a signal from a vehicle speed sensor detecting a speed of hybrid vehicle 10, a signal from an accelerator position sensor detecting an amount of operation of an accelerator pedal, and a signal from an engine rotation number sensor detecting the number of rotations of engine 12. HV-ECU 70 further receives a signal from an MG1 rotation number sensor for detecting a rotation speed of a motor generator MG1 (which will be described later) included in differential portion 20, a signal from an MG2 rotation number sensor for detecting a rotation speed of a motor generator MG2 (which will be described later) included in differential portion 20, and a signal from an output shaft rotation number sensor for detecting a rotation speed of the output shaft of transmission 30.

Furthermore, HV-ECU 70 further receives a signal from a lubricant temperature sensor detecting a temperature of a lubricant for differential portion 20 and transmission 30, a signal from a shift position sensor detecting a shift position indicated by a shift lever, and a signal from a VH sensor detecting a voltage VH (an input voltage of inverter 52) regulated by converter 54. HV-ECU 70 further receives a signal indicating an SOC value of electric power storage device 56 from battery ECU 66.

Figure 3:
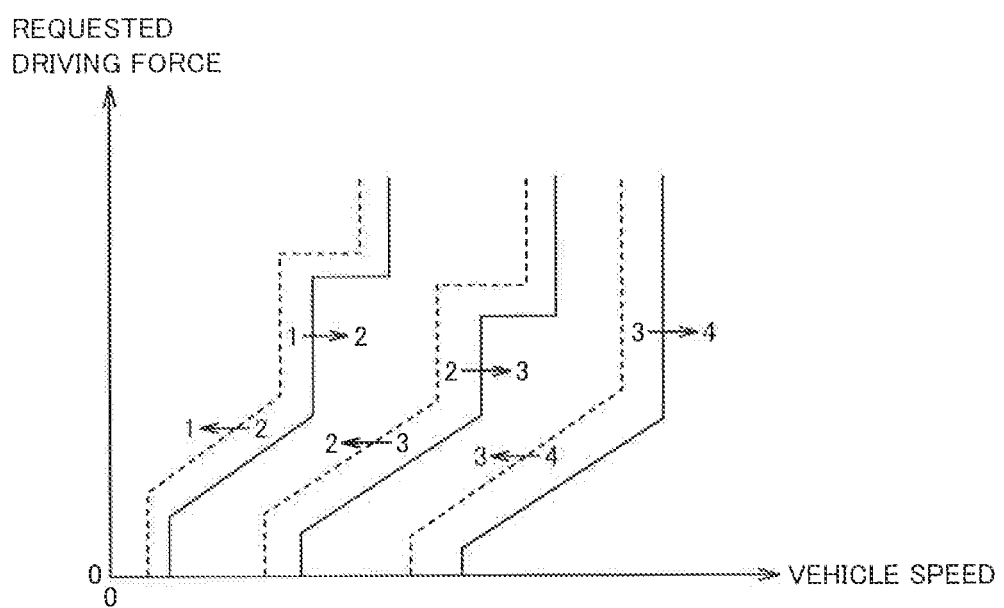
FIG. 3 is a diagram showing one example of a shift map of a transmission.

Then, HV-ECU 70 generates an engine torque instruction Ter indicating a target value for output torque of engine 12 based on the signals above and outputs the instruction to engine ECU 62. HV-ECU 70 generates torque instructions Tgr and Tmr for motor generators MG1 and MG2 of differential portion 20 and outputs the instructions to MG-ECU 64. HV-ECU 70 determines a gear position of transmission 30 in accordance with a shift map as shown in FIG. 3 and generates a torque capacity instruction Tcr for implementing the gear position and outputs the instruction to ECT-ECU 68.

Furthermore, HV-ECU 70 determines a target voltage VHr indicating a target value for voltage VH regulated by converter 54 and outputs target voltage VHr to MG-ECU 64. Specifically, HV-ECU 70 determines target voltage VHr by using a map or a relational expression prepared in advance, based on operating points of motor generators MG1 and MG2.

Engine ECU 62 which has received engine torque instruction Ter from HV-ECU 70 generates a throttle signal or an ignition signal for driving engine 12 and outputs the signal to engine 12. MG-ECU 64 generates signals PWI1 and PWI2 for drive of motor generators MG1 and MG2 by inverter 52 based on torque instructions Tgr and Tmr received from HV-ECU 70, and outputs the signals to inverter 52. MG-ECU 64 generates a signal PWC for controlling converter 54 such that voltage VH attains to target voltage VHr based on target voltage VHr received from HV-ECU 70, and outputs the signal to converter 54.

ECT-ECU 68 generates a hydraulic instruction such that transmission 30 has a torque capacity corresponding to torque capacity instruction Tcr and outputs the instruction to transmission 30.

(Configuration of Differential Portion and Transmission)

Figure 4:
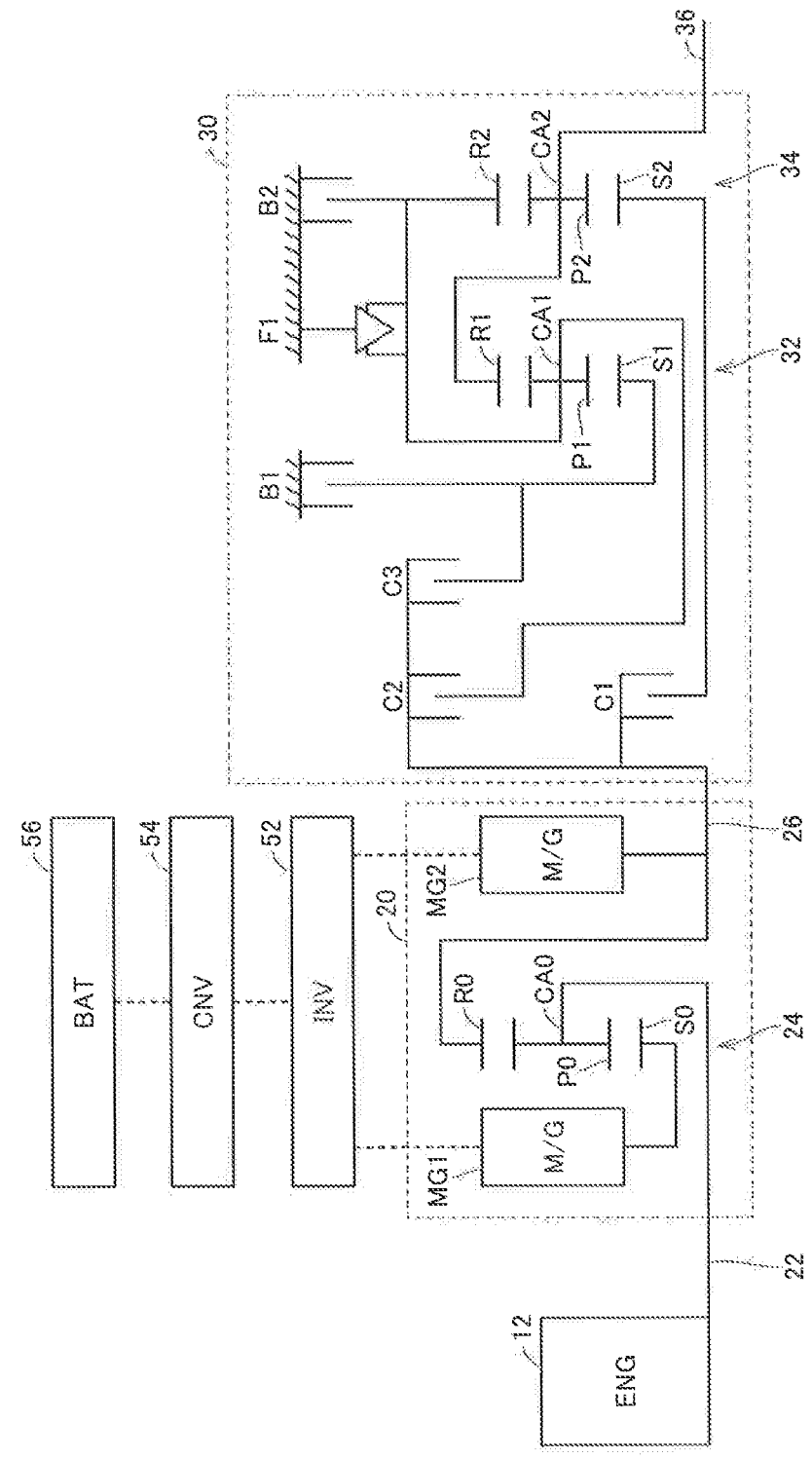
FIG. 4 is a diagram showing a configuration of a differential portion and a transmission shown in FIG. 1.

FIG. 4 is a diagram showing a configuration of differential portion 20 and transmission 30 shown in FIG. 1. Since differential portion 20 and transmission 30 are configured in symmetry with respect to an axis center thereof, FIG. 4 illustrates differential portion 20 and transmission 30 with a lower portion thereof being omitted.

Referring to FIG. 4, differential portion 20 includes motor generators MG) and MG2 and a power split device 24. Each of motor generators MG 1 and MG2 is an alternating-current motor, and it is implemented, for example, by a permanent magnet type synchronous motor including a rotor having a permanent magnet embedded. Motor generators MG1 and MG2 are driven by inverter 52.

Power split device 24 is implemented by a single pinion type pinion gear, and includes a sun gear S0, a pinion gear P0, a carrier CA0, and a ring gear R0. Carrier CA0 is coupled to an input shall 22, that is, the output shaft of engine 12, and supports pinion gear P0 in a rotatable and revolvable manner. Sun gear S0 is coupled to a rotation shaft of motor generator MG1. Ring gear R0 is coupled to a transmission member 26 and constructed to mesh with sun gear S0 with pinion gear P0 being interposed. A rotation shaft of motor generator MG2 is coupled to transmission member 26. Namely, ring gear R0 is coupled also to the rotation shaft of motor generator MG2.

Figures 5, 6:
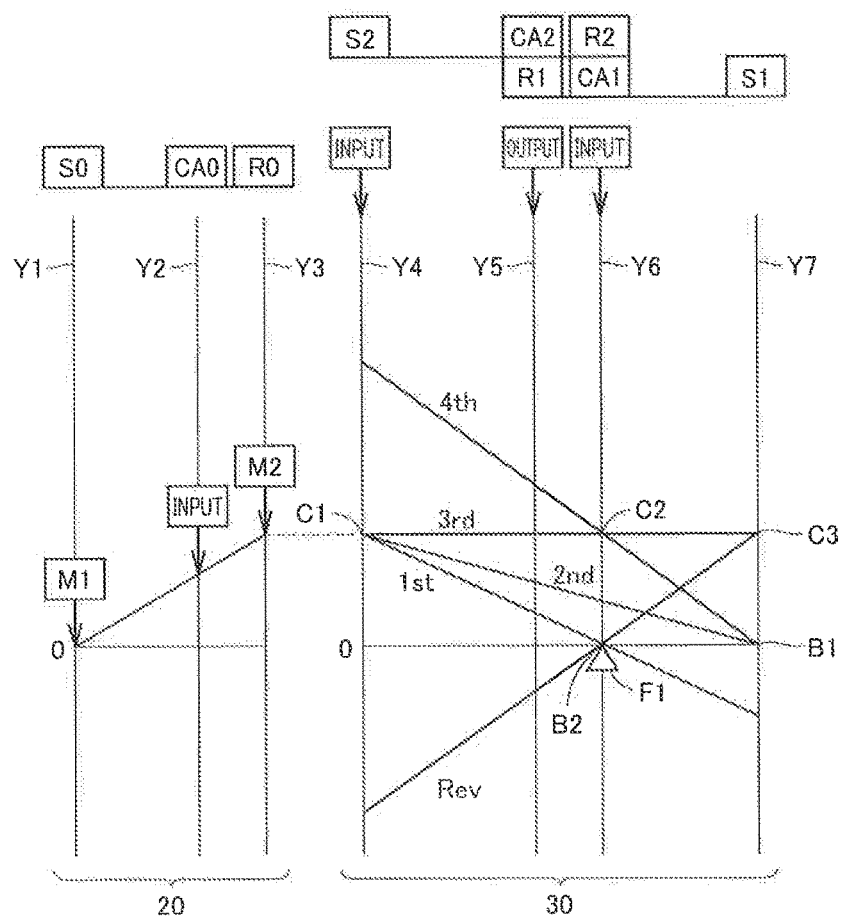
FIG. 5 is a diagram showing an engagement actuation table of the transmission shown in FIG. 4.
FIG. 6 is a nomographic chart of the differential portion and the transmission.

Power split device 24 functions as a differential device as sun gear S0, carrier CA0, and ring gear RU rotate relative to one another. The number of rotations of each of sun gear S0, carrier CA0, and ring gear RU satisfies relation as being connected by a straight line in a nomographic chart (FIG. 6 which will be described later). With a differential function of power split device 24, motive power output from engine 12 is distributed to sun gear S0 and ring gear R0. With motive power distributed to sun gear S0, motor generator MG1 is actuated as a generator, and electric power generated by motor generator MG1 is supplied to motor generator MG2 or stored in electric power storage device 56. Motor generator MG1 generates electric power with motive power divided by power split device 24 or motor generator MG2 is driven with electric power generated by motor generator MG1, so that differential portion 20 functions as a continuously variable transmission.

Transmission 30 includes single pinion type planetary gears 32 and 34, clutches C1 to C3, brakes B1 and B2, and a one-way clutch F1. Planetary gear 32 includes a sun gear S1, a pinion gear P1, a carrier CA1, and a ring gear R1. Planetary gear 34 includes a sun gear S2, a pinion gear P2, a carrier CA2, and a ring gear R2.

Each of clutches C1 to C3 and brakes B1 and B2 is a hydraulically actuated friction engagement device, and it is of a wet multi-plate type in which a plurality of layered friction plates are pressed by a hydraulic pressure or is made by a band brake in which one end of a band wound around an outer circumferential surface of a rotating drum is tightened by a hydraulic pressure. One-way clutch F1 supports carrier CA1 and ring gear R2 coupled to each other such that they can rotate in one direction whereas they cannot rotate in the other direction.

In this transmission 30, each engagement device of clutches C1 to C3 and brakes B1 and B2 as well as one-way clutch F1 is engaged in accordance with an engagement actuation table shown in FIG. 5, so that any one of a first gear to a fourth gear and a reverse gear is formed. In FIG. 5, a circle indicates an engaged state, a circle in parentheses indicates engagement during engine brake, a triangle indicates engagement only during drive, and a blank field indicates a released state. By setting each engagement device of clutches C1 to C3 and brakes B1 an B2 to a released state, a neutral state (a state in which motive power transmission is cut off) can be formed.

Referring again to FIG. 4, differential portion 20 and transmission 30 are coupled to each other through transmission member 26. Then, an output shaft 36 coupled to carrier CA2 of planetary gear 34 is coupled to differential gear 42 (FIG. 1).

FIG. 6 is a nomographic chart of differential portion 20 and transmission 30. Referring to FIG. 4 together with FIG. 6, a vertical line Y1 in the nomographic chart corresponding to differential portion 20 shows a rotation speed of sun gear S0 of power split device 24, that is, a rotation speed of motor generator MG1. A vertical line Y2 shows a rotation speed of carrier CA0 of power split device 24, that is, a rotation speed of engine 12. A vertical line Y3 shows a rotation speed of ring gear R0 of power split device 24, that is, a rotation speed of motor generator MG2. An interval among vertical lines Y1 to Y3 is determined in accordance with a gear ratio of power split device 24.

A vertical line Y4 in the nomographic chart corresponding to transmission 30 shows a rotation speed of sun gear S2 of planetary gear 34, and a vertical line Y5 shows a rotation speed of carrier CA2 of planetary gear 34 and ring gear R1 of planetary gear 32 which are coupled to each other. A vertical line Y6 represents a rotation speed of ring gear R2 of planetary gear 34 and carrier CA1 of planetary gear 32 which are coupled to each other, and a vertical line Y7 shows a rotation speed of sun gear S1 of planetary gear 32. An interval among vertical lines Y4 to Y7 is determined in accordance with a gear ratio of planetary gears 32 and 34.

As clutch C1 is engaged, sun gear S2 of planetary gear 34 is coupled to ring gear R0 of differential portion 20, and sun gear S2 rotates at the same speed as ring gear RU. As clutch C2 is engaged, carrier CA1 of planetary gear 32 and ring gear R2 of planetary gear 34 are coupled to ring gear R0, and carrier CA1 and ring gear R2 rotate at the same speed as ring gear R0. As clutch C3 is engaged, sun gear S1 of planetary gear 32 is coupled to ring gear R0, and sun gear S1 rotates at the same speed as ring gear R0. As brake B1 is engaged, rotation of sun gear S1 is stopped, and as brake B2 is engaged, rotation of carrier CA1 and ring gear R2 is stopped.

For example, as shown in the engagement actuation table in FIG. 5, when clutch C1 and brake B1 are engaged and other clutches and brake are released, the nomographic chart of transmission 30 is linear as shown with "2nd". Vertical line Y5 representing a rotation speed of carrier CA2 of planetary gear 34 shows an output rotation speed of transmission 30 (a rotation speed of output shaft 36). Thus, by engaging or releasing clutches C1 to C3 and brakes B1 and B2 in transmission 30 in accordance with the engagement actuation table in FIG. 5, the first gear to the fourth gear, the reverse gear, and the neutral state can be formed.

In differential portion 20, by controlling as appropriate rotation of motor generators MG1 and MG2, a continuously variable speed in which a rotation speed of ring gear R0, that is, a rotation speed of transmission member 26, can continuously be varied with respect to a rotation speed of engine 12 coupled to carrier CA0 is realized. By coupling transmission 30 which can vary a gear ratio between transmission member 26 and output shaft 36 to such differential portion 20, a speed ratio of differential portion 20 can be lowered while differential portion 20 has a continuously variable speed function, and loss in motor generators MG1 and MG2 can be decreased.

Figure 7:
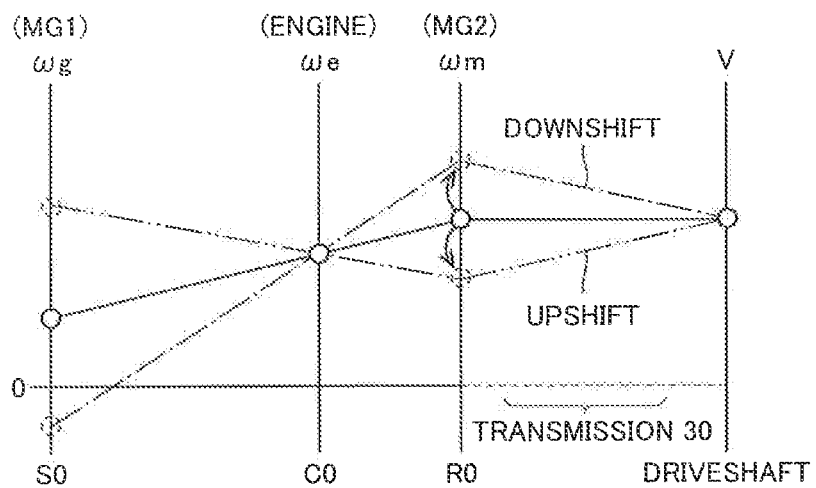
FIG. 7 is a diagram showing on a nomographic chart, a manner of change in rotation during gear shifting in the transmission.

FIG. 7 is a diagram showing on a nomographic chart, a manner of change in rotation during gear shifting in transmission 30. Referring to FIG. 7, since a rotation speed V of a driveshaft (the output shaft of transmission 30) is constrained by rotation of the drive wheel, rotation speed V of the driveshaft hardly varies before and after gear shifting (downshift upshift). Therefore, in downshift (raising a gear ratio), as shown with a chain dotted line, a rotation speed of input shaft of transmission 30, that is, a rotation speed (inn of motor generator MG2, increases. During upshift (lowering in gear ratio), as shown with a chain double dotted line, rotation speed ωm of motor generator MG2 decreases. With change in rotation speed urn of motor generator MG2, a rotation speed ωg of motor generator MG1 also changes.

Thus, in hybrid vehicle 10 according to the present embodiment, a rotation speed of motor generators MG1 and MG2 sharply changes with a gear shifting operation in transmission 30. Therefore, in order not to interfere gear shifting in transmission 30 and further to smoothly carry out gear shifting in transmission 30, torque of motor generators MG1 and MG2 should suddenly be changed. In other words, by suddenly changing torque of motor generators MG1 and MG2, shift shock during gear shifting in transmission 30 can be lessened.

A torque instruction for motor generators MG1 and MG2 is basically set such that electric power input to and output from electric power storage device 56 does not exceed an allowable value (allowable output electric power Wout and allowable input electric power Win). Owing to delay caused by communication among ECUs or delay caused by filtering processing, delay in effectuation of control of a torque instruction calculated in HV-ECU 70 (FIG. 2) actually takes place, and electric power input to and output from electric power storage device 56 may exceed the allowable value under this influence. Such delay in effectuation always takes place regardless of whether or not a gear is being shifted in transmission 30, however, it gives rise to a problem when such delay affects excess over electric power of electric power storage device 56 during gear shifting in which torque of motor generators MG1 and MG2 is suddenly changed. Excess of electric power input to and output from electric power storage device 56 over allowable output electric power Wout or allowable input electric power Win representing the allowable value leads to deterioration of electric power storage device 56.

Then, in hybrid vehicle 10 according to the present embodiment, as will be described below, by appropriately setting restriction on a rate of change in torque of motor generators MG1 and MG2 in accordance with a situation, prevention of excess electric power of electric power storage device 56 (that is, suppression of deterioration of electric power storage device 56) by allowing restriction of sudden change in torque of motor generators MG1 and MG2 and lessening of shift shock by allowing sudden change in torque of motor generators MG1 and MG2 are both achieved.

First Embodiment

Figure 8:
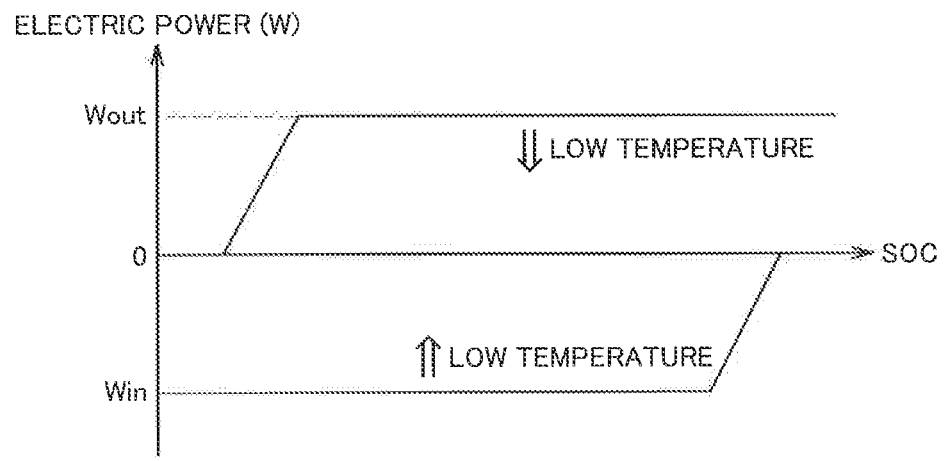
FIG. 8 is a diagram showing allowable output electric power and allowable input electric power of an electric power storage device.

FIG. 8 is a diagram showing allowable output electric power Wout and allowable input electric power Win of electric power storage device 56. Referring to FIG. 8, when a temperature TB of electric power storage device 56 lowers, allowable output electric power Wout and allowable input electric power Win lower. Allowable output electric power Wout lowers also when SOC of electric power storage device 56 lowers in order to prevent overdischarge of electric power storage device 56, and allowable input electric power Win lowers also when SOC is high in order to prevent overcharge of electric power storage device 56.

As temperature TB of electric power storage device 56 lowers, allowable output electric power Wout and allowable input electric power Win lower, and hence when electric power storage device 56 is at a low temperature, attention should be paid such that electric power input to and output from electric power storage device 56 due to sudden change in torque of motor generators MG1 and MG2 does not exceed allowable output electric power Wout and allowable input electric power Win. Unless electric power storage device 56 is at a low temperature, so long as SOC has not significantly lowered or increased, allowable output electric power Wout and allowable input electric power Win are relaxed and hence sudden change in torque of motor generators MG1 and MG2 can be allowed and shift shock can be lessened.

Then, in hybrid vehicle 10 according to this first embodiment, when a temperature of electric power storage device 56 lowers, restriction of a rate of change in torque of motor generators MG1 and MG2 is made stricter so as to suppress electric power input to and output from electric power storage device 56. When a temperature of electric power storage device 56 has not lowered, restriction of a rate of change in torque of motor generators MG1 and MG2 is relaxed and sudden change in torque of motor generators MG1 and MG2 is allowed to thereby lessen shift shock.

Figure 9:
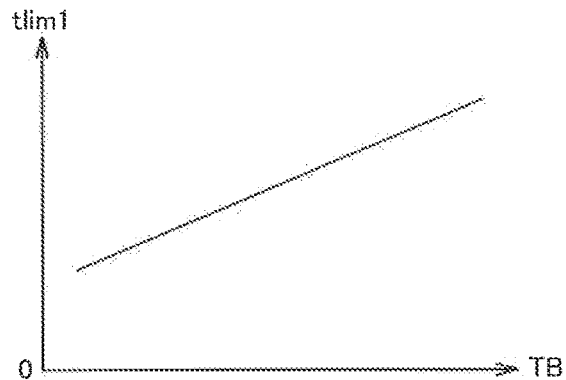
FIG. 9 is a diagram showing a restriction value for a rate of change in torque of a motor generator in a first embodiment.

FIG. 9 is a diagram showing a restriction value for a rate of change in torque of the motor generator in the first embodiment. Referring to FIG. 9, the abscissa shows temperature TB of electric power storage device 56, and the ordinate representatively shows a restriction value tlim1 for a rate of change in torque of motor generator MG2. As temperature TB of electric power storage device 56 is lower, restriction value dim 1 is smaller. Thus, as temperature TB is lower, electric power input to and output from electric power storage device 56 is suppressed and excess of electric power input to and output from electric power storage device 56 over allowable output electric power Wout and allowable input electric power Win which are lower as temperature TB is lower can be prevented.

When temperature TB of electric power storage device 56 becomes higher, restriction value tlim1 is greater. Thus, sudden change in torque of motor generator MG2 is allowed and shift shock can be lessened during gear shifting in which sudden change in torque of motor generator MG2 is particularly demanded.

Regarding restriction value tlim1, a restriction value while temperature TB of electric power storage device 56 is low should only be smaller than a restriction value while temperature TB is high. Namely, without being limited to such a case that restriction value tlim1 is smaller as temperature TB is lower as shown in FIG. 9, for example, restriction value tlim1 may intermittently decrease with lowering in temperature TB. In a region where temperature TB is higher than a certain prescribed temperature, restriction value tlim 1 may be constant, and when temperature. TB is lower than the prescribed temperature, restriction value tlim1 may be smaller with lowering in temperature TB. Alternatively, in a region where temperature TB is higher than a certain prescribed temperature, restriction value 'dim' may be smaller with lowering in temperature TB, and when temperature TB is lower than a prescribed temperature, restriction value tlim1 may be constant.

Figure 10:
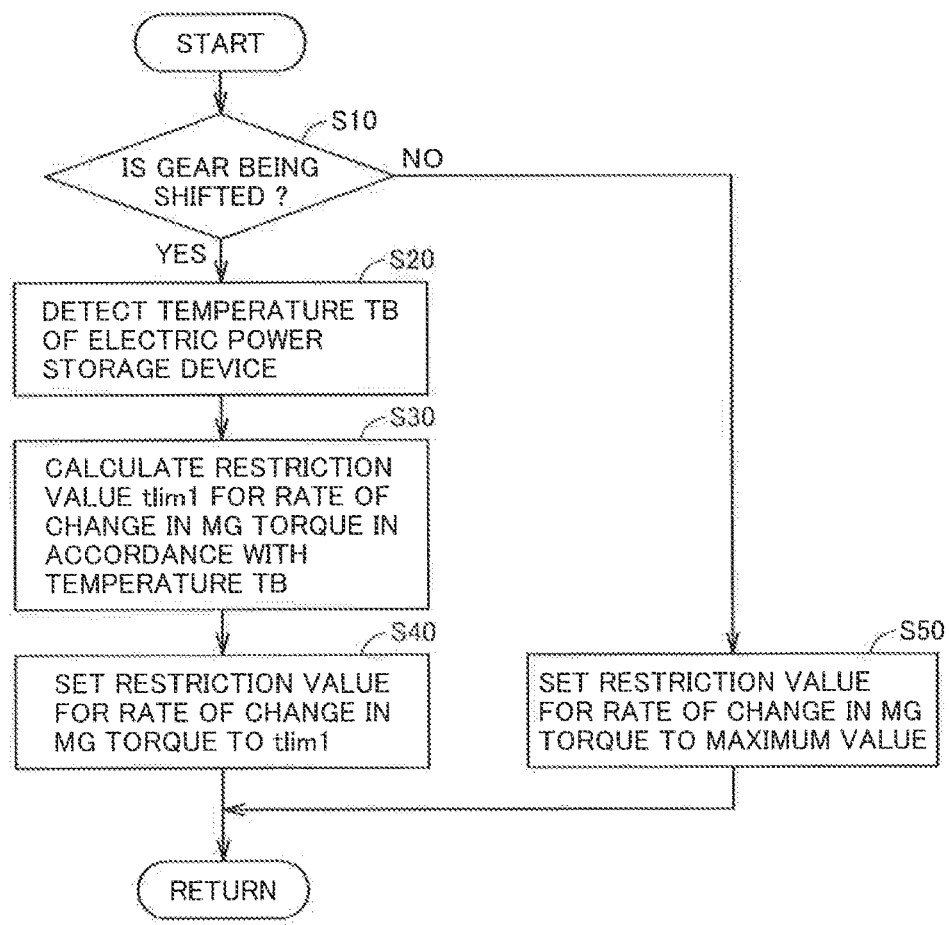
FIG. 10 is a flowchart illustrating processing for setting a restriction value for a rate of change in torque of the motor generator in the first embodiment.

FIG. 10 is a flowchart illustrating processing for setting a restriction value for a rate of change in torque of the motor generator in the first embodiment. Though motor generator MG2 will be described representatively below, similar processing, is performed also for motor generator MG1. Processing shown in this flowchart is performed as being invoked from a main routine every prescribed time period or when a prescribed condition is satisfied.

Referring to FIG. 10, HV-ECU 70 (FIGS. 1 and 2) of control device 60 determines whether or not a gear is being shifted in transmission 30 (step S10). When it is determined that the gear is being shifted (YES in step S10), temperature TB of electric power storage device 56 is detected (step S20). Temperature TB is detected by a not-shown temperature sensor.

Then, HV-ECU 70 calculates restriction value tlim1 in accordance with temperature TB of electric power storage device 56 detected in step S20, by using a map or a relational expression prepared in advance, which shows relation between temperature TB and restriction value tlim1, for a rate of change in torque of motor generator MG2 as shown in FIG. 9 (step S30). Then, HV-ECU 70 sets the restriction value for the rate of change in torque of motor generator MG2 to restriction value tlim1 calculated in step S30 (step S40).

When it is determined in step S10 that the gear is not being shifted in transmission 30 (NO in step S10), HV-ECU 70 sets the restriction value for the rate of change in torque of motor generator MG2 to a default maximum value (step S50).

Each processing in steps S30, S40, and S50 may be performed by MG-ECU 64 actually controlling torque of motor generator MG2.

As set forth above, in this first embodiment, since the restriction value for the rate of change in torque of motor generators MG1 and MG2 while temperature TB of electric power storage device 56 is low is smaller than the restriction value for the rate of change in torque while temperature TB is high, electric power input to and output from electric power storage device 56 is suppressed at a low temperature at which an allowable value for electric power' input to and output from electric power storage device 56 (allowable output electric power Wout and allowable input electric power Win) is small. Since restriction of the rate of change in torque of motor generators MG1 and MG2 is relaxed unless electric power storage device 56 is at a low temperature, sudden change in torque of motor generators MG1 and MG2 is allowed and shift shock can be lessened. Therefore, according to this first embodiment, lessening of shift shock and suppression of deterioration of electric power storage device 56 can both be achieved.

Though the restriction value for the rate of change in torque of motor generators MG1 and MG2 has been described above, a restriction value for a rate of change in power instead of the rate of change in torque may be changed in accordance with temperature TB. Namely, a restriction value for a rate of change in power of motor generators MG1 and MG2 while temperature TB of electric power storage device 56 is low may be smaller than a restriction value for a rate of change in power while temperature TB is high. In this case as well, as in the case of the rate of change in torque, lessening of shift shock and suppression of deterioration of electric power storage device 56 can both be achieved.

Second Embodiment

While the gear is being shifted in transmission 30, great shift shock may take place in a latter half of gear shifting in which a clutch is engaged (while a degree of progress of gear shifting is large). Then, in this second embodiment, in the latter half of gear shifting, a restriction value for a rate of change in torque of motor generators MG1 and MG2 is made larger so as to allow sudden change in torque of motor generators MG1 and MG2 and to lessen shift shock. In a first half of gear shifting, a restriction value for a rate of change in torque of motor generators MG1 and MG2 is made smaller such that electric power input to and output from electric power storage device 56 does not exceed an allowable value (allowable output electric power Wout and allowable input electric power Win).

Figure 11:
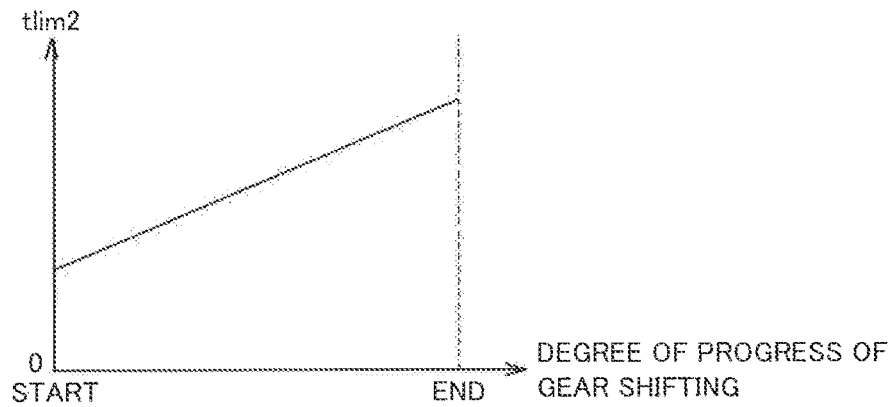
FIG. 11 is a diagram showing a restriction value for a rate of change in torque of a motor generator in a second embodiment.

FIG. 11 is a diagram showing a restriction value for a rate of change in torque of the motor generator in the second embodiment. Referring to FIG. 11, the abscissa shows a degree of progress of gear shifting in transmission 30, and the ordinate representatively shows a restriction value tlim2 for the rate of change in torque of motor generator MG2. Regarding a degree of progress of gear shifting, since an input rotation speed of transmission 30 before and after gear shifting can be calculated based on an output rotation speed of transmission 30 and a gear ratio before and after gear shifting, a degree of progress of gear shifting can be calculated based on the input rotation speed of transmission 30 during gear shifting.

As the degree of progress of gear shifting is greater, restriction value tlim2 is greater. Thus, in the latter half of gear shifting in which large shift shock may take place, sudden change in torque of motor generator MG2 is allowed and shift shock can be lessened. When the degree of progress of gear shifting is small, restriction value tlim2 is small and hence sudden change in torque of motor generator MG2 is suppressed. Thus, electric power input to and output from electric power storage device 56 is suppressed, and in particular, excess of input and output electric power over allowable output electric power Wout and allowable input electric power Win while electric power storage device 56 is at a low temperature can be prevented.

Regarding restriction value tlim2, the restriction value in the latter half of gear shifting should only be greater than the restriction value in the first half of gear shifting. Namely, without being limited to a case that restriction value tlim2 is greater with progress of gear shifting as shown in FIG. 11, for example, restriction value tlim2 may intermittently increase with progress in gear shifting. In the first half of gear shifting, restriction value tlim2 may be greater with progress of gear shifting and thereafter may be constant. Alternatively, in the first half of gear shifting, restriction value tlim2 may be constant and thereafter restriction value tlim2 may be greater with progress of gear shifting.

Figure 12:
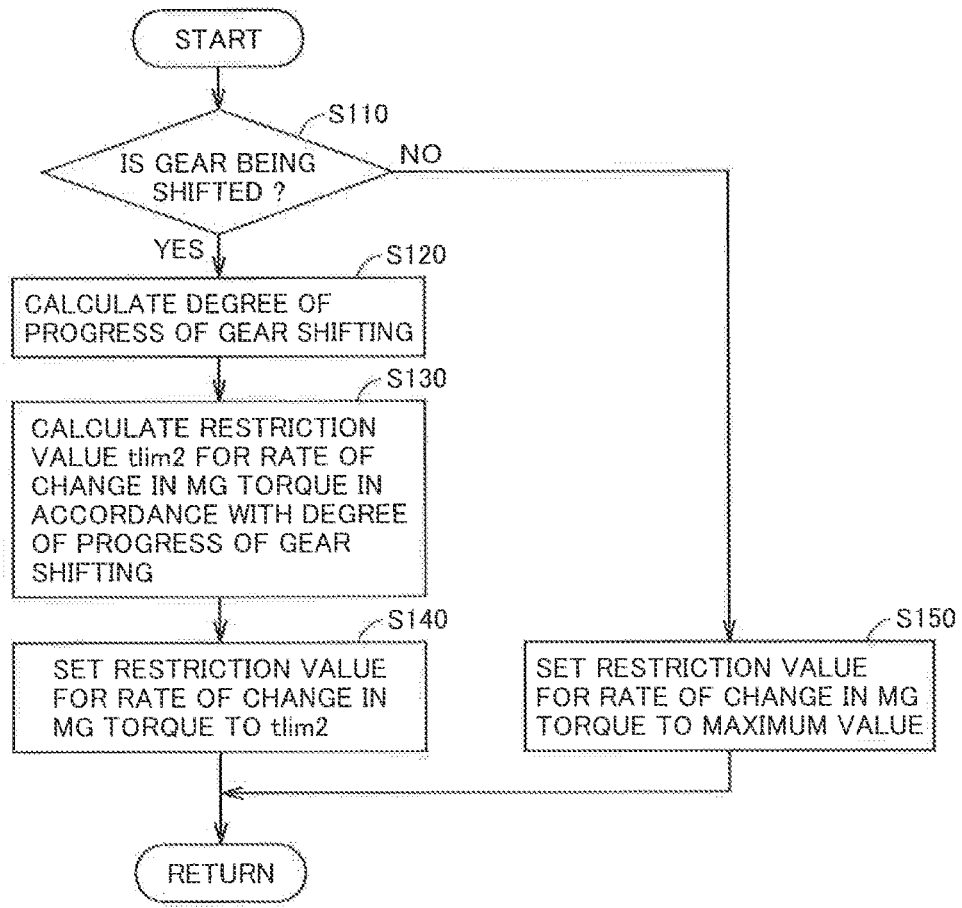
FIG. 12 is a flowchart illustrating processing for setting a restriction value for a rate of change in torque of the motor generator in the second embodiment.

FIG. 12 is a flowchart illustrating processing for setting a restriction value for a rate of change in torque of the motor generator in the second embodiment. Though motor generator MG2 will again be described representatively below, similar processing is performed also for motor generator MG1. Processing shown in this flowchart is also performed as being invoked from a main routine every prescribed time period or when a prescribed condition is satisfied.

Referring to FIG. 12, HV-ECU 70 determines whether or not the gear is being shifted in transmission 30 (step S110). When it is determined that the gear is being shifted (YES in step S110), 1W-ECU 70 calculates a degree of progress of gear shifting in transmission 30 (step S120). As described above, a degree of progress of gear shifting, which is defined to have a value 0 at the time of start of gear shifting and to have a value 1 at the time of end of gear shifting, can be calculated, for example, based on an input rotation speed of transmission 30 before and after gear shifting and an input rotation speed of transmission 30 during gear shifting.

Then, HV-ECU 70 calculates restriction value tlim2 in accordance with the degree of progress of gear shifting calculated in step S120 by using a map or a relational expression prepared in advance, which shows relation between the degree of progress of gear shifting and restriction value tlim2 for the rate of change in torque of motor generator MG2 as shown in FIG. 11 (step S130). Then, HV-ECU 70 sets the restriction value for the rate of change in torque of motor generator MG2 to restriction value tlim2 calculated in step S130 (step S140).

When it is determined in step S110 that the gear is not being shifted iii transmission 30 (NO in step S110), HV-ECU 70 sets the restriction value for the rate of change in torque of motor generator MG2 to the default maximum value (step S150).

The processing in step S120 may be performed by ECT-ECU 68 (FIGS. 1 and 2) having gear shifting in transmission 30 carried out. Each processing in steps S130 and S140 may be performed by MG-ECU 64 actually controlling torque of motor generator MG2.

As above, in this second embodiment, since the restriction value for the rate of change in torque of motor generators MG1 and MG2 in the latter half of gear shifting is greater than the restriction value for the rate of change in torque in the first half of gear shifting, in the latter half of gear shifting in which great shift shock may take place, sudden change in torque of motor generators MG1 and MG2 is allowed and shift shock can be lessened. In the first half of gear shifting, since the restriction value for the rate of change in torque of motor generators MG1 and MG2 is small, electric power input to and output from electric power storage device 56 is suppressed and deterioration of electric power storage device 56 is suppressed. Therefore, according to this second embodiment, lessening of shift shock and suppression of deterioration of electric power storage device 56 can both be achieved.

Third Embodiment

In this third embodiment, a case that a restriction value for a rate of change in torque of motor generators MG1 and MG2 is determined based on temperature TB of electric power storage device 56 and a degree of progress of gear shifting in transmission 30 will be described.

FIG. 13 is a diagram showing a restriction value for a rate of change in torque of the motor generator in the third embodiment. Referring to FIG. 13 when temperature TB of electric power storage device 56 is row and a degree of progress of gear shifting in transmission 30 is small (in the first half of gear shifting), restriction value tlim1 for the rate of change in torque in accordance with temperature TB of electric power storage device 56 shown in FIG. 9 is employed. Since temperature TB is low, attention should be paid to input to and output from electric power storage device 56. On the other hand, in the first half of gear shifting, it is not necessary to suddenly change torque of motor generators MG1 and MG2 in order to lessen shift shock. Then, when temperature TB is low and a degree of progress of gear shifting is small (in the first half of gear shifting), restriction value tlim1 (FIG. 9) in accordance with temperature TB is employed.

When temperature TB of electric power storage device 56 is low and when a degree of progress of gear shifting in transmission 30 is large (in the latter half of gear shifting), restriction value tlim2 for the rate of change in torque in accordance with the degree of progress of gear shifting shown in FIG. 11 is employed. In this situation, with temperature TB being low, necessity to suppress input to and output front electric power storage device 56 and necessity to suddenly change torque of the motor generator for lessening large shift shock which may take place in the latter half of gear shifting conflict each other. In this third embodiment, when a degree of progress of gear shifting is large (in the latter half of gear shifting) in spite of temperature TB being low, with priority being placed on lessening of shift shock, restriction value tlim2 (FIG. 11) in accordance with a degree of progress of gear shifting is employed.

When a temperature of electric power storage device 56 is high, regardless of the first half or the latter half of gear shifting, a default maximum value tlin max is set as the restriction value for the rate of change in torque of motor generators MG1 and MG2.

Figure 14:
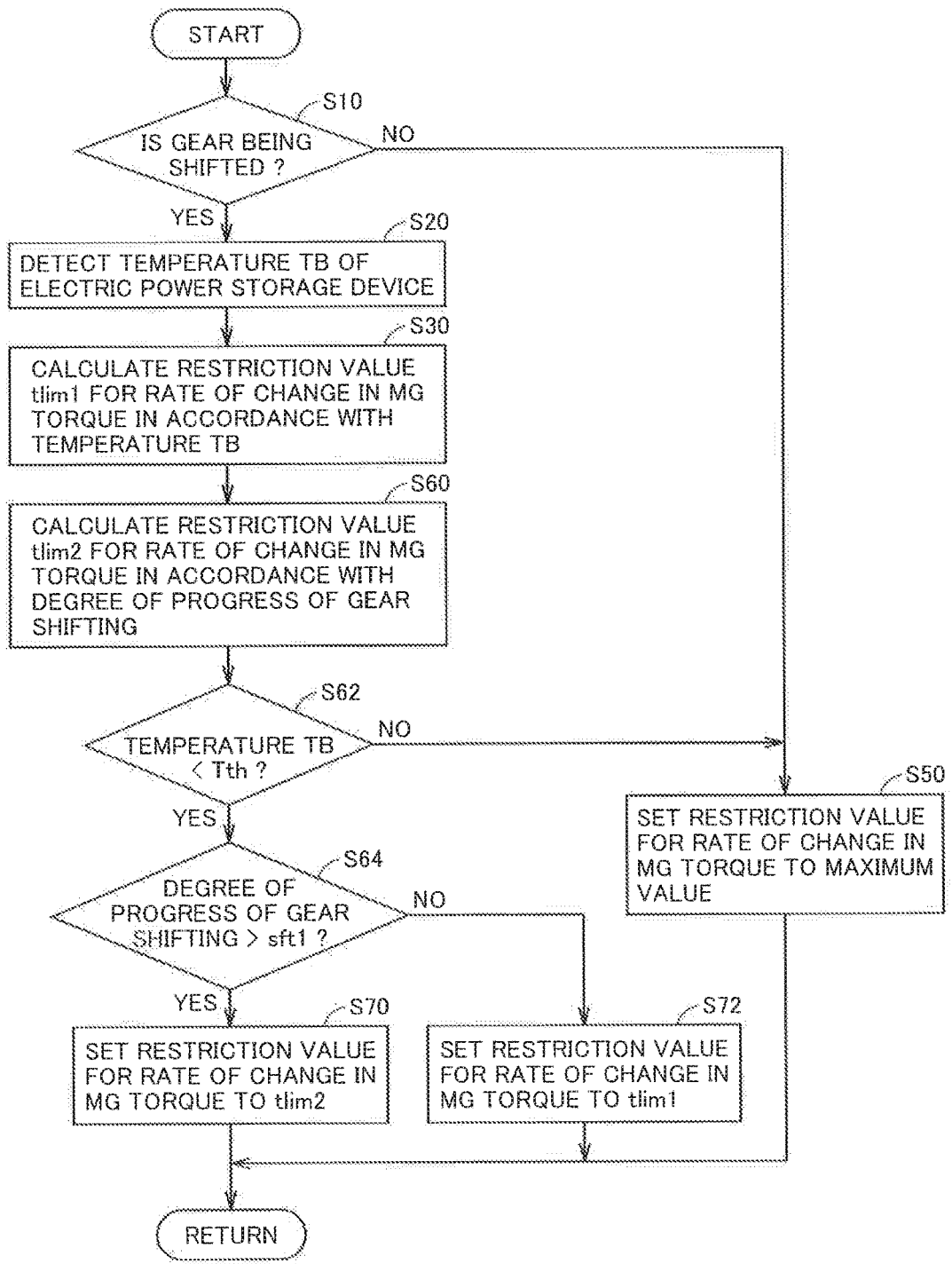
FIG. 14 is a flowchart illustrating processing for setting a restriction value for a rate of change in torque of the motor generator in the third embodiment.

FIG. 14 is a flowchart illustrating processing for setting a restriction value for a rate of change in torque of the motor generator in the third embodiment. Though motor generator MG2 will again be described representatively below, similar processing is performed also for motor generator MG1. Processing shown in this flowchart is also performed as being invoked from a main routine every prescribed time period or when a prescribed condition is satisfied.

Referring to FIG. 14, this flowchart includes steps S60, S62, S64, S70, and S72 instead of step S40, in the flowchart of the setting processing in the first embodiment shown in FIG. 10. Namely when restriction value tlim1 in accordance with temperature TB of electric power storage device 56 is calculated in step S30, HV-ECU 70 calculates a degree of progress of gear shifting in transmission 30 and calculates restriction value tlim2 in accordance with the calculated degree of progress of gear shifting (step S60). The processing in this step S60 is the same as the processing in steps S120 and S130 shown in FIG. 12 in the second embodiment.

Then. HV-ECU 70 determines whether or not temperature TB of electric power storage device 56 is lower than a prescribed threshold value Tth (step S62). This threshold value Tth is set, for example, to a temperature at which it is determined that electric power input to and output from electric power storage device 56 will not exceed allowable output electric power Wout and allowable input electric power Win even if torque of motor generator MG2 suddenly changes during gear shifting. Then, when it is determined that temperature TB is equal to or higher than threshold value Tth (NO in step S62), the process makes transition to step S50 and the restriction value for the rate of change in torque of motor generator MG2 is set to the default maximum value.

When it is determined in step S62 that temperature TB is lower than threshold value Tth (YES in step S62), HV-ECU 70 determines whether or not a degree of progress of gear shifting in transmission 30 is greater than a prescribed threshold value sft1 (step S64). This threshold value sll is set, far example, to a degree of progress of gear shifting at which determination as the latter half of gear shifting in which large shift shock may take place is made.

When it is determined that the degree of progress of gear shifting is greater than threshold value sft1 (YES in step S64), HV-ECU 70 sets the restriction value for the rate of change in torque of motor generator MG2 to restriction value tlim2 calculated in step S60 (step S70). Namely, when temperature TB is low and when the degree of progress of gear shifting is large (in the latter half of gear shifting), restriction value tlim2 in accordance with a degree of progress of gear shifting shown in FIG. 11 is employed.

When it is determined in step S64 that the degree of progress of gear shifting is equal to or smaller than threshold value sft1 (NO in step S64), HV-ECU 70 sets the restriction value for the rate of change in torque of motor generator MG2 to restriction value tlim1 calculated in step S30 (step S72). Namely, when temperature TB is low and when the degree of progress of gear shifting is small (in the first half of gear shifting), restriction value tlim1 in accordance with temperature TB shown in FIG. 9 is employed.

Figure 15:
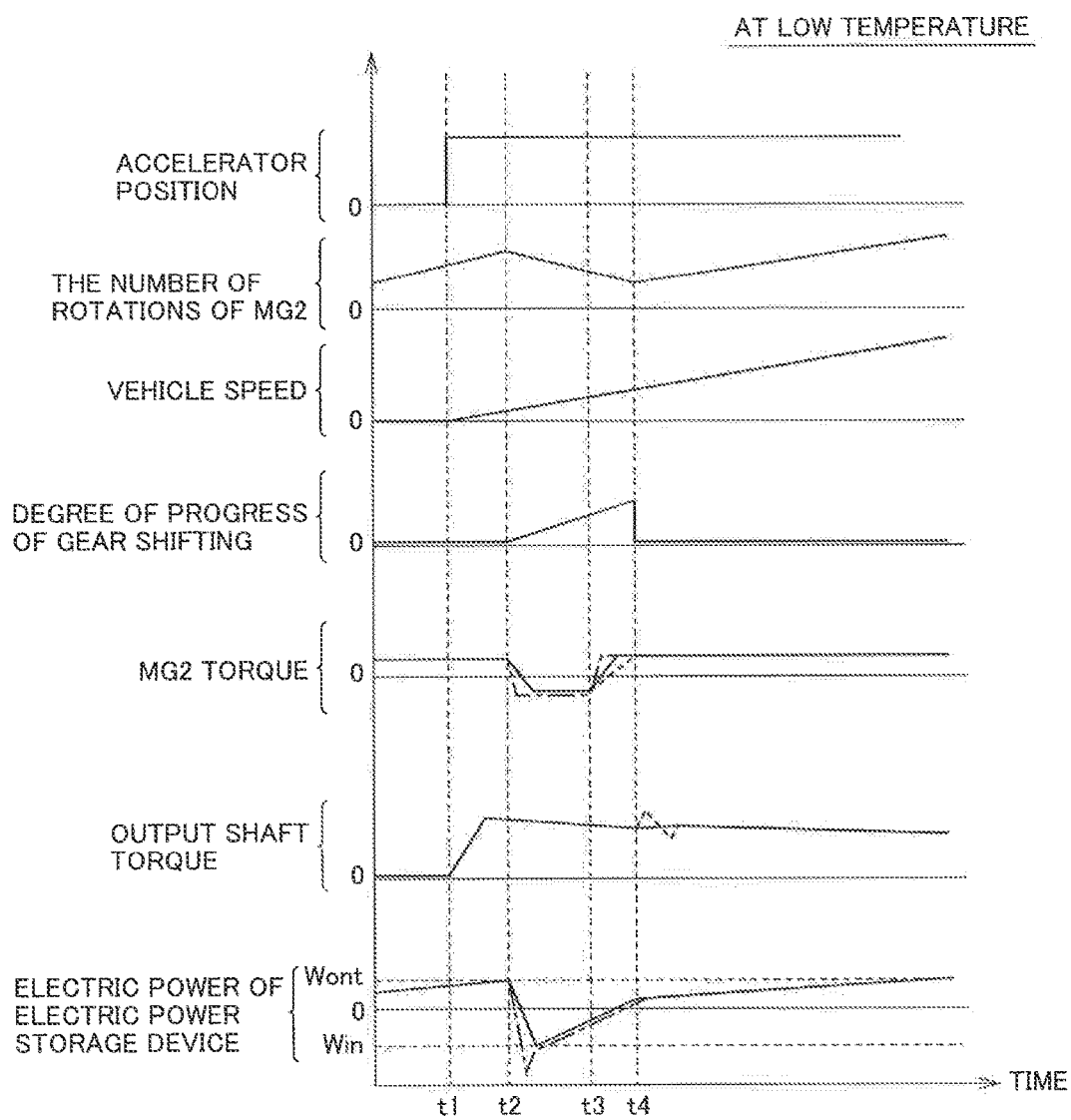
FIG. 15 is a time chart showing a behavior of representative, various physical amounts during gear shifting in the transmission.

FIG. 15 is a time chart showing a behavior of representative, various physical amounts during gear shifting in transmission 30. Referring to FIG. 15, this time chart shows a behavior while a temperature of electric power storage device 56 is low by way of example.

A solid line shows a behavior in this third embodiment. A dotted line shows a behavior in a case that only restriction value tlim1 in accordance with temperature TB is employed, which corresponds to the first embodiment. A chain dotted line shows a behavior in a case that the restriction value for the rate of change in torque of motor generator MG2 is set to the maximum value, as a reference example. In a portion where the dotted line or the chain dotted line is not shown, the dotted line or the chain dotted line is superimposed on the solid line.

Gear shifting is started at time t2 and gear shifting ends at time t4. When the rate of change in torque of motor generator MG2 is not restricted (the chain dotted line), electric power of electric power storage device 56 exceeds the allowable value (allowable input electric power Win) (from time t2 to t3) due to sudden change in torque of motor generator MG2 during gear shifting.

When only restriction value tlim1 in accordance with temperature TB is employed (the dotted line), the rate of change in torque of motor generator MG2 is restricted also in the latter half of gear shifting (because temperature TB is low), and hence shift shock (fluctuation in output shaft torque) takes place after gear shifting ended. Shift shock occurs only when electric power storage device 56 is at a low temperature. When temperature TB has increased to a temperature around a room temperature, restriction value thrill is relaxed (FIG. 9) and sudden change in torque of motor generator MG2 is allowed and hence shift shock is lessened.

In this third embodiment (the solid line), in the latter half of gear shifting (the degree of progress of gear shifting being large), restriction value tlim2 is employed and restriction of the rate of change in torque of motor generator MG2 is relaxed. Thus, in the latter half of gear shifting, sudden change in torque of motor generator MG2 is allowed and shift shock (fluctuation in output shaft torque) is lessened.

As above, in this third embodiment, when temperature TB of electric power storage device 56 is low, in the first half of gear shifting in which the degree of progress of gear shifting is small, restriction value thud in accordance with temperature TB is employed for the rate of change in torque of motor generators MG1 and MG2. Thus, electric power input to and output from electric power storage device 56 is suppressed and deterioration of electric power storage device 36 is suppressed. In the latter half of gear shifting in which the degree of progress of gear shifting is large, restriction value tlim2 in accordance with the degree of progress of gear shifting is employed for the rate of change in torque of motor generators MG1 and MG2. Thus, in the latter half of gear shifting in which large shift shock may take place, with priority being placed on lessening of shift shock, sudden change in torque of motor generators MG1 and MG2 is allowed and shift shock is lessened. Therefore, according, to this third embodiment, lessening of shift shock and suppression of deterioration of electric power storage device 56 can both be achieved.

Fourth Embodiment

Referring again to FIG. 13, in the third embodiment, when temperature TB of electric power storage device 56 is low and the degree of progress of gear shifting is large (in the latter half of gear shifting), restriction value tlim2 (FIG. 11) for the rate of change in torque of motor generators MG1 and MG2 in accordance with the degree of progress of gear shifting is employed, for the purpose of lessening shift shock. Shift shock actually gives rise to a problem when an acceleration opening is small and a vehicle speed is low. Shift shock does not give rise to a serious problem in a case that an accelerator opening is large in which large acceleration is demanded or in a case that a vehicle speed is high.

In this fourth embodiment, while temperature TB is low and the degree of progress of gear shifting is large (in the latter half of gear shifting), restriction value tlim2 in accordance with the degree of progress of gear shifting is employed only when an accelerator opening is small and when a vehicle speed is low, and when an accelerator opening is large or when a vehicle speed is high, restriction value tlim1 (FIG. 9) in accordance with temperature TB is employed.

FIG. 16 is a diagram showing a restriction value for a rate of change in torque of the motor generator when temperature TB of electric power storage device 56 is low and a degree of progress of gear shifting is large in the fourth embodiment. Referring to FIG. 16, when an accelerator opening is small and a vehicle speed is low, restriction value tlim2 in accordance with the degree of progress of gear shifting shown in FIG. 11 is employed. Thus, shift shock is lessened.

When an accelerator opening is large or when a vehicle speed is high restriction value tlim1 in accordance with temperature TB of electric power storage device 56 shown in FIG. 9 is employed. When the accelerator opening is large or when the vehicle speed is high, with priority being placed on suppression of deterioration of electric power storage device 56 rather than on lessening of shift shock, restriction value tlim1 in accordance with temperature TB is employed.

Figure 17:
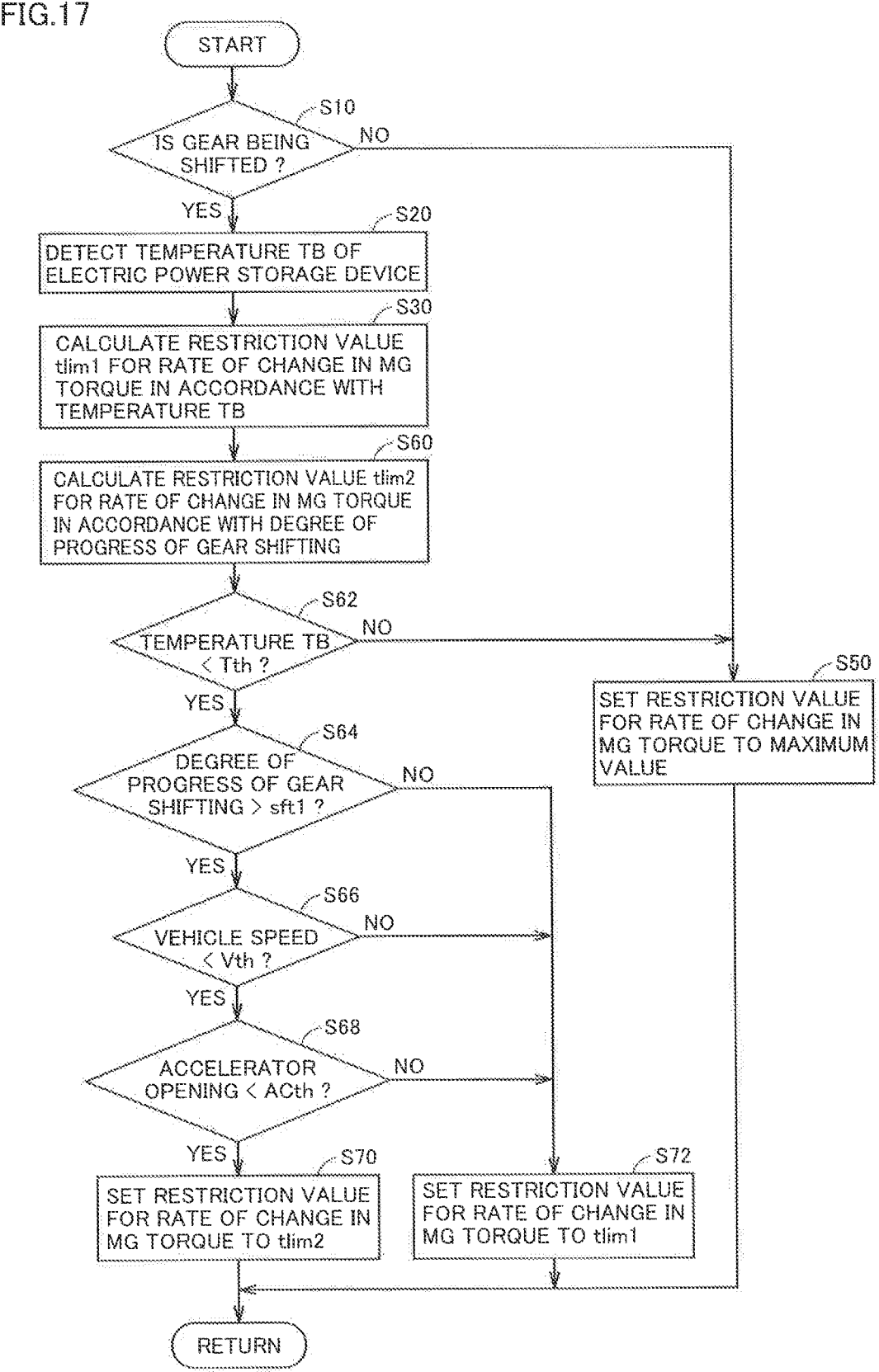
FIG. 17 is a flowchart illustrating processing for setting a restriction value for a rate of change in torque of the motor generator in the fourth embodiment.

FIG. 17 is a flowchart illustrating processing for setting a restriction value for a rate of change in torque of the motor generator in the fourth embodiment. Though motor generator MG2 will again be described representatively below, similar processing is performed also for motor generator MG1. Processing shown in this flowchart is also performed as being invoked from a main routine every prescribed time period or when a prescribed condition is satisfied.

Referring to FIG. 17, this flowchart further includes steps S66 and S68 in the flowchart of the setting processing in the third embodiment shown in FIG. 14. Namely, when it is determined in step S62 that temperature TB of electric power storage device 56 is lower than threshold value Tth (YES in step S62) and further it is determined in step S64 that the degree of progress of gear shifting in transmission 30 is larger than threshold value sft1 (YES in step S64), HV-ECU 70 determines whether or not a vehicle speed is lower than a prescribed threshold value Vth (step S66). When the vehicle speed is determined as being lower than threshold value Vth (YES in step S66), HV-ECU 70 determines whether or not an accelerator opening is smaller than a prescribed threshold value ACth (step S68). These threshold values Vth and ACth are set as appropriate from a point of view of whether or not shift shock can give rise to a problem.

When it is determined in step S68 that the accelerator opening is smaller than threshold value ACth (YES in step S68), the process makes transition to step S70, and the restriction value for the rate of change in torque of motor generator MG2 is set to restriction value tlim2 calculated in step S60. Namely, while temperature TB is low and while the degree of progress of gear shifting is large (in the latter half of gear shifting), when the vehicle speed is low and when the accelerator opening is small, restriction value tlim2 in accordance with the degree of progress of gear shifting shown in FIG. 11 is employed.

When it is determined in step S66 that the vehicle speed is equal to or higher than threshold value Vth (NO in step S66) or when it is determined in step S68 that the accelerator opening is equal to or larger than threshold value ACth (NO in step S68), the process makes transition to step S72 and the restriction value for the rate of change in torque of motor generator MG2 is set to restriction value tlim1 calculated in step S30. Namely, while temperature TB is low and while the degree of progress of gear shifting is small (in the first half of gear shifting), when the vehicle speed is high or when the accelerator opening is large, restriction value tlim1 in accordance with temperature TB shown in FIG. 9 is employed.

In this fourth embodiment, even though temperature TB of electric power storage device 56 is low and the degree of progress of gear shifting is large (in the latter half of gear shifting), when the vehicle speed is high or when the accelerator opening is large, shift shock does not give rise to a problem. Therefore, deterioration of electric power storage device 56 is suppressed by using restriction value tlim1 in accordance with temperature TB. Thus, according to this fourth embodiment, suppression of deterioration of electric power storage device 56 can be reinforced.

[First Modification]

In the first, third, and fourth embodiments, restriction value tlim1 for the rate of change in torque of the motor generator in accordance with temperature TB of electric power storage device 56 is employed. Though this restriction value tlim1 is set from a point of view of suppression of deterioration of electric power storage device 56, power should be managed in accordance with change in rotation speed when change in rotation speed of the motor generator is abrupt.

Figure 18:
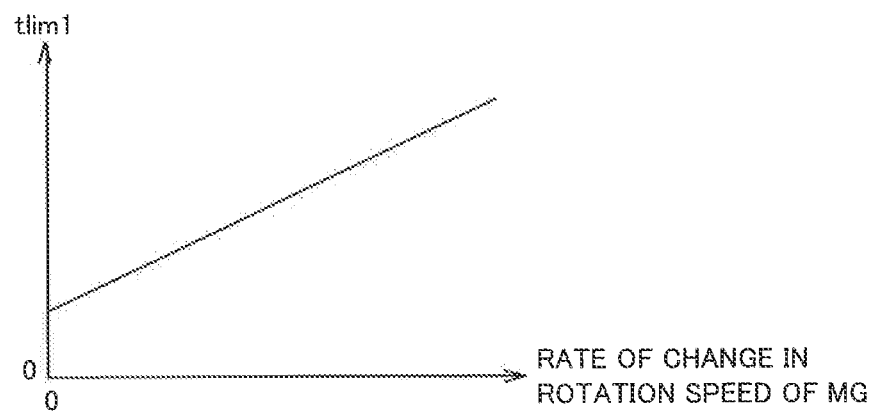
FIG. 18 is a diagram showing relation between a rate of change in rotation speed of the motor generator and a restriction value for a rate of change in torque.

Then, when the restriction value for the rate of change in torque of motor generator MG2 (MG1) is set to restriction value tlim1 (FIG. 9) in accordance with temperature TB, restriction value tlim1 may be increased as the rate of change in rotation speed of motor generator MG2 (MG1) is higher as shown in FIG. 18.

Regarding restriction value thrill, the restriction value while the rate of change in rotation speed of motor generator MG2 (MG1) is high should only be larger than the restriction value while the rate of change in rotation speed is low. Namely, without being limited to the case that restriction value tlim1 is greater as the rate of change in rotation speed is higher as shown in FIG. 18, for example, restriction value tlim1 may intermittently increase with increase in rate of change in rotation speed. In a region where a rate of change in rotation speed is lower than a certain value, restriction value thrill may increase with increase in rate of change and may thereafter be constant. Alternatively, in a region where a rate of change in rotation speed is lower than a certain value, restriction value third may be constant and restriction value tlim1 may thereafter increase with increase in rate of change.

In a specific method for calculating restriction value tlim1 in this first modification, in step S30 in FIGS. 10, 14, and 17, restriction value tlim1 in accordance with temperature TB of electric power storage device 56 and a rate of change in rotation speed of motor generator MG2 (MG1) is calculated with the use of a map or a relational expression prepared in advance.

Fifth Embodiment

Figure 19:
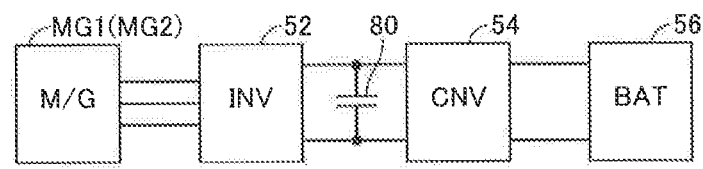
FIG. 19 is an electric circuit diagram of the hybrid vehicle shown in FIG. 1.

FIG. 19 is a schematic diagram of an electric system of hybrid vehicle 10 shown in FIG. 1. Referring to FIG. 19, a capacitor 80 is provided between inverter 52 and converter 54. Capacitor 80 is provided to smoothen a direct-current voltage regulated by converter 54 and provided to inverter 52.

Motor generators MG1 and MG2 are actuated by exchanging electric power with electric power storage device 56, and basically, power of motor generators MG1 and MG2 is controlled so as not to exceed allowable output electric, power Wout and allowable input electric power Win of electric power storage device 56. Even though power of motor generators MG1 and MG2 does not exceed allowable output electric power Wout and allowable input electric power Win, with sudden change in power of motor generators MG1 and MG2, for example, during gear shifting in transmission 30, electric power input to and output from electric power storage device 56 may exceed allowable output electric power Wout and allowable input electric power Win.

By way of example, when power of motor generator MG2 increases, electric power is taken out of capacitor 80 and voltage VH of capacitor 80 lowers. Then, converter 54 is actuated in order to regulate voltage VH to a target value, and thus electric power is output from electric power storage device 56. Since converter 54 is actuated as voltage VH lowers, due to delay in control of converter 54 in response to change in power of motor generator MG2, output from electric power storage device 56 with actuation of converter 54 may exceed allowable output electric power Wout, in spite of power of motor generator MG2 being smaller than allowable output electric power Wout.

Here, electric power supplied from electric power storage device 56 to capacitor 80 (hereinafter also referred to as "capacitor power consumption") with actuation of converter 54 is expressed as a capacity of capacitor 80×voltage VH×a rate of change in voltage VH (dVH/dt). Therefore, with the rate of change (dVH/dt) in voltage VH in accordance with change in power of motor generator MG2 being the same, when voltage VH is high, capacitor power consumption is high and output electric power of electric power storage device 56 is high. This is also the case with decrease in power of motor generator MG2, and when voltage VH is high, input electric power of electric power storage device 56 is high.

Then, in the hybrid vehicle according to this fifth embodiment, when voltage VH is high, change in power of motor generator MG2 is restricted. Thus, increase in electric power exchanged between capacitor 80 and electric power storage device 56 is suppressed, and excess of electric power input to and output from electric power storage device 56 over allowable output electric power Wout and allowable input electric power Win is suppressed.

Since allowable output electric power Wout and allowable input electric power Win are smaller with lowering in temperature of electric power storage device 56, further restriction of change in power of motor generator MG2 is preferred when temperature TB of electric power storage device 56 is low.

Figure 20:
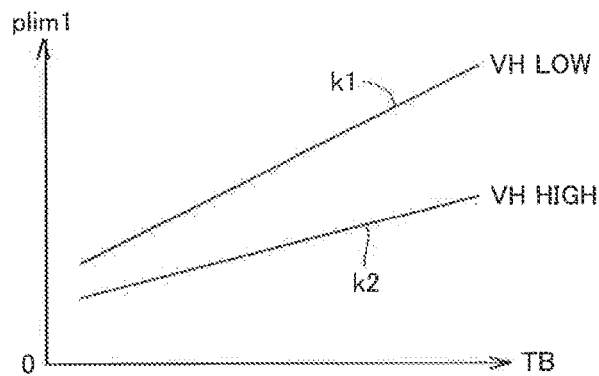
FIG. 20 is a diagram showing a restriction value for a rate of change in power of the motor generator in a fifth embodiment.

FIG. 20 is a diagram showing a restriction value for a rate of change in power of the motor generator in the fifth embodiment. Referring to FIG. 20, the abscissa shows temperature TB of electric power storage device 56, and the ordinate representatively shows a restriction value plim1 for a rate of change in power of motor generator MG2. A line k1 shows restriction value plim1 while voltage VH of capacitor 80 is relatively low, and a line k2 shows restriction value plim1 while voltage VH is relatively high.

Restriction value plim1 is set to be smaller as voltage VH of capacitor 80 is higher. Restriction value plim1 is set to be smaller as temperature TB of electric power storage device 56 is lower. Thus, as voltage VH is higher or as temperature TB is lower, electric power input to and output from electric power storage device 56 is suppressed and excess of electric power input to and output from electric power storage device 56 over allowable output electric power Wout and allowable input electric power Win can be suppressed.

Restriction value plim1 is set to be greater as voltage VH of capacitor 80 is lower. Restriction value plim1 is set to be greater with increase in temperature TB of electric power storage device 56. Thus, sudden change in power of motor generator MG2 is allowed and shift shock can be lessened during gear shifting in which sudden change in power of motor generator MG2 is particularly demanded.

Regarding relation between restriction value plim1 and voltage VH, a restriction value while voltage VH is high should only be smaller than a restriction value while voltage VH is low. Namely, as described above, without being limited to a case that restriction value plim 1 is smaller as voltage VH is higher, for example, restriction value plim1 may intermittently decrease as voltage VH is higher. In a region where voltage VH is lower than a certain prescribed voltage, restriction value plim1 may be constant and when voltage VH exceeds the prescribed voltage, restriction value plim1 may be smaller as voltage VH is higher. Alternatively, in a region where voltage VH is lower than a certain prescribed voltage, restriction value plim 1 may be smaller as voltage VH is higher, and when voltage VH exceeds the prescribed voltage, restriction value plim1 may be constant.

Regarding relation between restriction value plim1 and temperature TB of electric power storage device 56 as well, a restriction value while temperature TB is low should only be smaller than a restriction value while temperature TB is high. Namely, without being limited to a case that restriction value plim1 is smaller as temperature TB is lower as shown in FIG. 20, for example, restriction value plim1 may intermittently decrease with lowering in temperature TB. In a region where temperature TB is higher than a certain prescribed temperature, restriction value plim1 may be constant, and when temperature TB is lower than the prescribed temperature, restriction value plim1 may decrease with lowering in temperature TB. Alternatively, in a region where temperature TB is higher than a certain prescribed temperature, restriction value plim1 may decrease with lowering in temperature TB, and when temperature TB is lower than the prescribed temperature, restriction value plim 1 may be constant.

Figure 21:
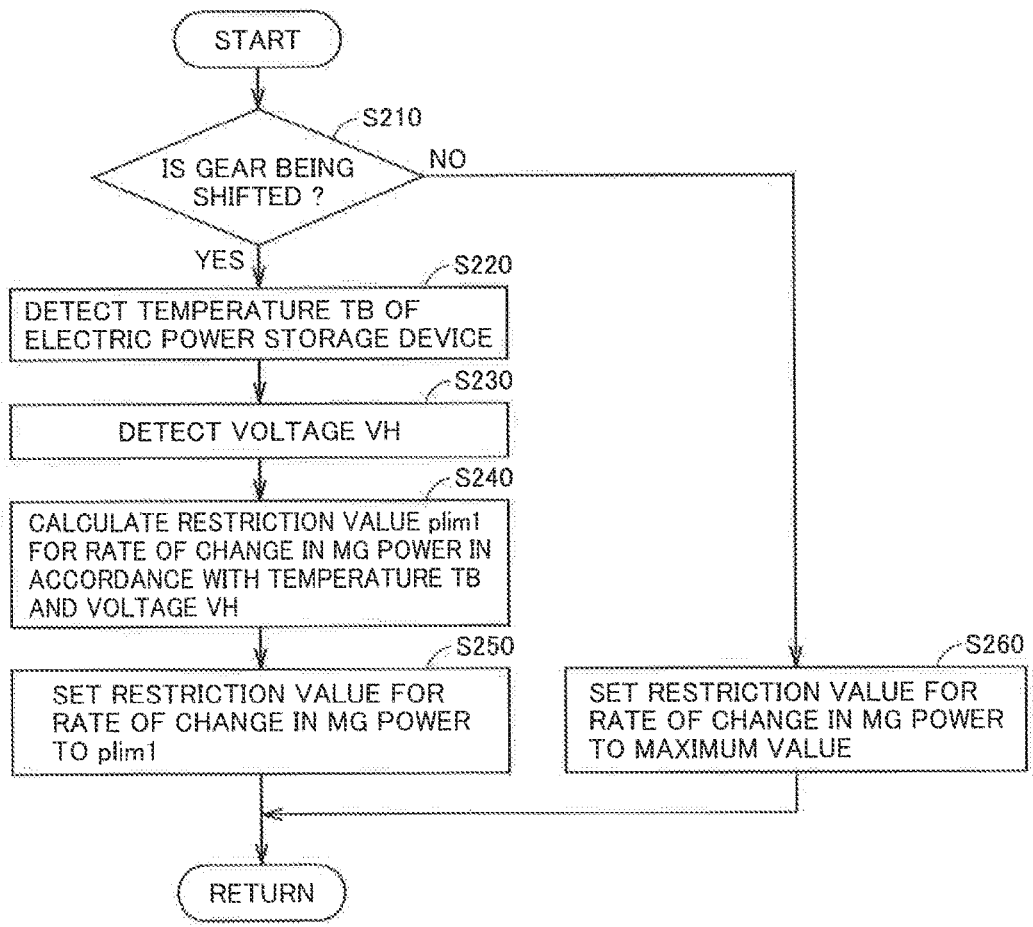
FIG. 21 is a flowchart illustrating processing for setting a restriction value for a rate of change in power of the motor generator in the fifth embodiment.

FIG. 21 is a flowchart illustrating processing for setting a restriction value for a rate of change in power of the motor generator in the fifth embodiment. Though motor generator MG2 will again be described representatively below, similar processing is performed also for motor generator MG1. Processing shown in this flowchart is also performed as being invoked from a main routine every prescribed time period or when a prescribed condition is satisfied.

Referring to FIG. 21, HV-ECU 70 (FIGS. 1 and 2) of control device 60 determines whether or not the gear is being shifted in transmission 30 (step S210). When it is determined that the gear is being shifted (YES in step S210), temperature TB of electric power storage device 56 is detected (step S220), and further voltage VH of capacitor 80 is detected (step S230). Temperature TB is detected by a not-shown temperature sensor and voltage VH is detected by a not-shown voltage sensor.

Then, HV-ECU 70 calculates restriction value plim1 in accordance with temperature TB and voltage VH detected in steps S220 and S230 based on a map or a relational expression prepared in advance, which shows relation among temperature TB, voltage VH, and restriction value plim1 for the rate of change in power of motor generator MG2 as shown in FIG. 20 (step S240). Then, HV-ECU 70 sets the restriction value for the rate of change in power of motor generator MG2 to restriction value plim1 calculated in step S240 (step S250).

When it is determined in step S210 that the gear is not being shifted in transmission 30 (NO in step S210), HV-ECU 70 sets the restriction value for the rate of change in power of motor generator MG2 to the default maximum value (step S260).

Each processing in steps S240, S250, and S260 may be performed by MG-ECU 64 actually controlling power of motor generator MG2.

Figure 22:
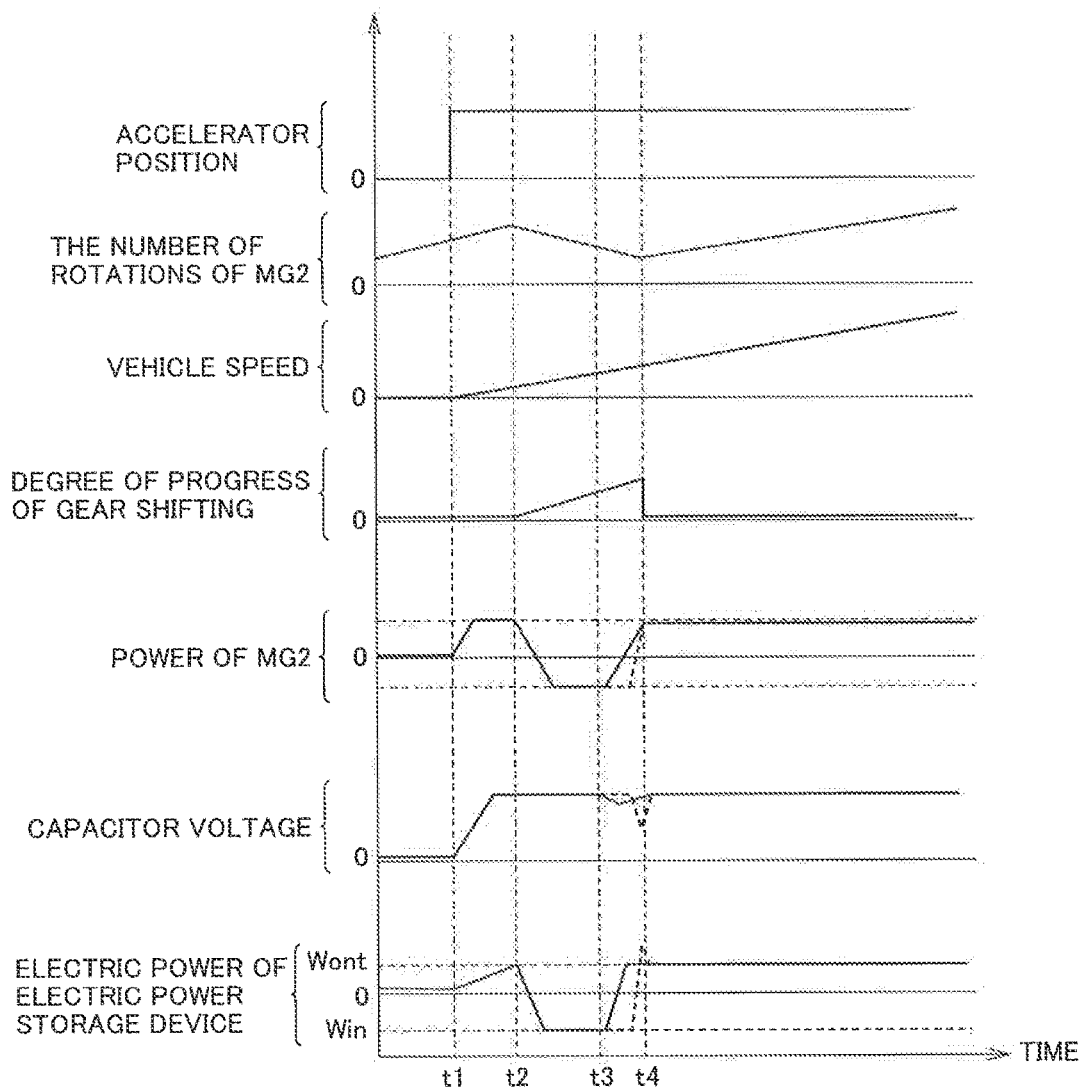
FIG. 22 is a time chart showing a behavior of representative, various physical amounts during gear shifting in the transmission in the fifth embodiment.

FIG. 22 is a time chart showing a behavior of representative, various physical amounts during gear shifting in transmission 30 in the fifth embodiment. Referring to FIG. 22, a solid line shows a behavior in this fifth embodiment. A dotted line shows a behavior in a case that the restriction value for the rate of change in power of motor generator MG2 is set to the maximum value, as a reference example. In a portion where the dotted line is not shown, the dotted line is superimposed on the solid line.

Gear shifting is started at time 12 and gear shifting ends at time 14. Voltage VH of capacitor 80 increases from time t1 and voltage VH is relatively high. When the rate of change in power of motor generator MG2 is not restricted (the dotted line), fluctuation in voltage is great due to sudden change in power of motor generator MG2 during gear shifting, and electric power of electric power storage device 56 exceeds the allowable value (allowable output electric power Wout) (from time t3 to t4).

In contrast, in this fifth embodiment (the solid line), with voltage VH of capacitor 80 being high, the rate of change in power of motor generator MG2 is restricted. Thus, fluctuation in voltage VH is suppressed and electric power input to and output from electric power storage device 56 can be suppressed to allowable output electric power Wout and allowable input electric power Win.

As above, in this fifth embodiment, since the restriction value for the rate of change in power of motor generators MG1 and MG2 while voltage VH is high is smaller than the restriction value for the rate of change in power while voltage VH is low, electric power input to and output from capacitor 80 and electric power input to and output from electric power storage device 56 while voltage VH is high are suppressed. While voltage VH is low, restriction of the rate of change in power of motor generators MG1 and MG2 is relaxed. Therefore, for example, during gear shifting, sudden change in power of motor generators MG1 and MG2 is allowed and shift shock can be lessened. Therefore, according to this fifth embodiment, suppression of deterioration of electric power storage device 56 and lessening of shift shock can both be achieved.

Furthermore, according to this fifth embodiment, since the restriction value for the rate of change in power while temperature TB of electric power storage device 56 is low is smaller than the restriction value for the rate of change in power while temperature TB is high, suppression of deterioration of electric power storage device 56 can be reinforced.

Sixth Embodiment

In this sixth embodiment, a configuration in which a restriction value for a rate of change in power of motor generators MG1 and MG2 is determined based on voltage VH of capacitor 80, temperature TB of electric power storage device 56, and a degree of progress of gear shifting in transmission 30 will be described.

FIG. 23 is a diagram showing a restriction value for a rate of change in power of the motor generator in the sixth embodiment. Referring to FIG. 23, when an accelerator opening is large, restriction value plim1 for the rate of change in power of the motor generator in accordance with voltage VH of capacitor 80 and temperature TB of electric power storage device 56 shown in FIG. 20 is employed. When the accelerator opening is large, power of motor generator MG2 for running is high and a target of voltage VH of capacitor 80 is set to a high value. As described in the fifth embodiment, in a situation that voltage VH is high, capacitor power consumption is high and electric power input to and output from electric power storage device 56 is high. Therefore, electric power input to and output from electric power storage device 56 may exceed allowable output electric power Wout and allowable input electric power Win. Then, while the accelerator opening is large with voltage being VH, restriction value plim1 in accordance with voltage VH and temperature TB (FIG. 20) is employed.

When an accelerator opening is small and when a vehicle speed is low, restriction value plim2 for the rate of change in power of the motor generator in accordance with the degree of progress of gear shifting shown in FIG. 24 is employed. When the accelerator opening is small and when the vehicle speed is low, lessening of shift shock is particularly demanded, and restriction value plim2 in accordance with the degree of progress of gear shifting is employed.

Figure 25:
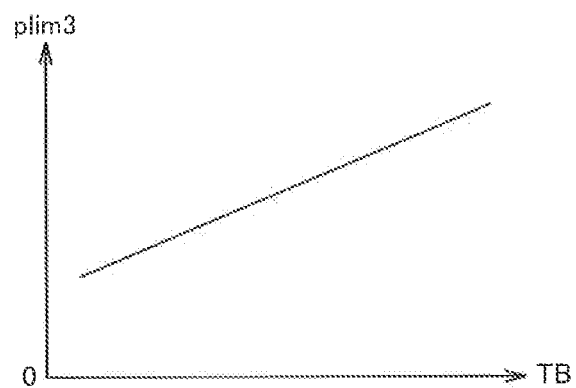
FIG. 25 is a diagram showing relation between a temperature of the electric power storage device and a restriction value for a rate of change in power of the motor generator.

When an accelerator opening is small and when a vehicle speed is high, a restriction value plim3 for the rate of change in power of the motor generator in accordance with temperature TB of electric power storage device 56 shown in FIG. 25 is employed. Since the accelerator opening is small, power of motor generator MG2 is not large either, and hence voltage VH of capacitor 80 is not high either. Then, when the accelerator opening is small and when the vehicle speed is high, it is not necessary to take voltage VH into account as in the case of restriction value plim1, and restriction value plim3 in accordance only with temperature TB of electric power storage device 56 is employed.

Figure 26:
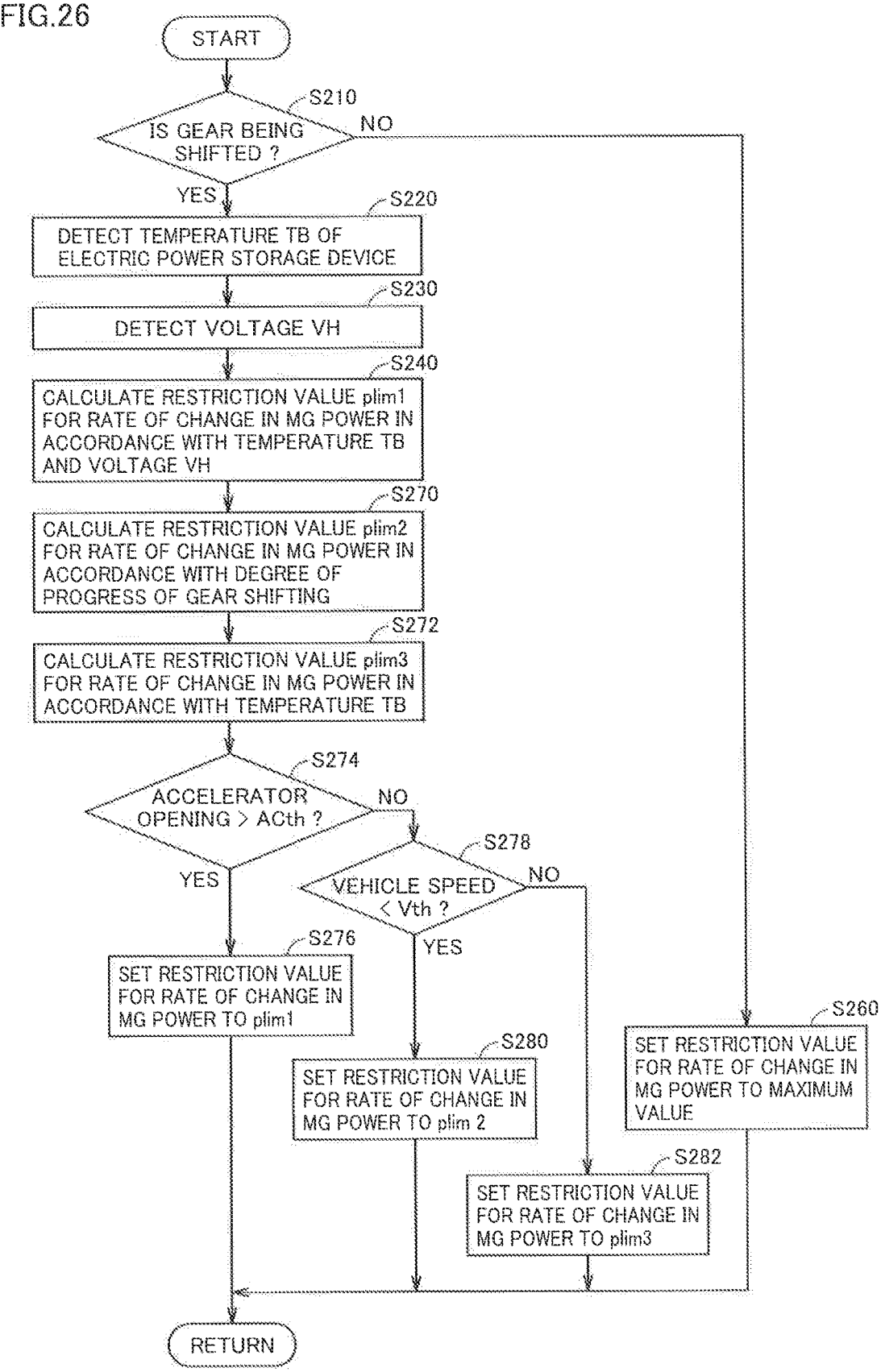
FIG. 26 is a flowchart illustrating processing for setting a restriction value for a rate of change in power of the motor generator in the sixth embodiment.

FIG. 26 is a flowchart illustrating processing for setting a restriction value for a rate of change in power of the motor generator in the sixth embodiment. Though motor generator MG2 will again be described representatively below, similar processing is performed also for motor generator MG1. Processing shown in this flowchart is also performed as being invoked from a main routine every prescribed time period or when a prescribed condition is satisfied.

Referring to FIG. 26, this flowchart includes steps S270 to S282 instead of step S250 in the flowchart of the setting processing in the fifth embodiment shown in FIG. 21. Namely, when restriction value plim1 in accordance with temperature TB and voltage VH is calculated in step S240, HV-ECU 70 calculates a degree of progress of gear shifting in transmission 30 and calculates restriction value plim2 in accordance with the degree of progress of gear shifting based on a map or a relational expression prepared in advance, which shows relation between the degree of progress of gear shilling and restriction value plim2 for the rate of change in power of motor generator MG2 as shown in FIG. 24 (step S270). Furthermore, HV-ECU 70 calculates restriction value plim3 in accordance with temperature TB of electric power storage device 56 detected in step S220 based on a map or a relational expression prepared in advance, which shows relation between temperature TB and restriction value plim3 for the rate of change in power of motor generator MG2 as shown in FIG. 25 (step S272).

Then, HV-ECU 70 determines whether or not an accelerator opening is larger than prescribed threshold value ACth (step S274). When it is determined that the accelerator opening is larger than threshold value ACth (YES in step S274), HV-ECU 70 sets the restriction value for the rate of change in power of motor generator MG2 to restriction value plim1 calculated in step S240 (step S276). Namely, when the accelerator opening is large, restriction value plim1 in accordance with voltage VH and temperature TB (FIG. 20) is employed.

When it is determined in step S274 that the accelerator opening is equal to or smaller than threshold value ACth (NO in step S274), HV-ECU 70 determines whether or not a vehicle speed is lower than prescribed threshold value Vth (step S278). When it is determined that the vehicle speed is lower than threshold value Vth (YES in step S278), HV-ECU 70 sets the restriction value for the rate of change in power of motor generator MG2 to restriction value plim2 calculated in step S270 (step S280). Namely, when the accelerator opening is small and when the vehicle speed is low, restriction value plim2 in accordance with the degree of progress of gear shifting (FIG. 24) is employed.

When it is determined in step S278 that the vehicle speed is equal to or higher than threshold value Vth (NO in step S278), HV-ECU 70 sets the restriction value for the rate of change in power of motor generator MG2 to restriction value plim3 calculated in step S272 (step S282). Namely, when the accelerator opening is small and when the vehicle speed is high, restriction value plim3 in accordance only with temperature TB of electric power storage device 56 (FIG. 25) is employed.

With the configuration as above, according to this sixth embodiment, lessening of shift shock and suppression of deterioration of the electric power storage device can both be achieved.

[Second Modification]

In the fifth embodiment, restriction value plim1 for the rate of change in power of motor generators MG1 and MG2 in accordance with temperature TB of electric power storage device 56 and voltage VH of capacitor 80 is employed. In the sixth embodiment, furthermore, restriction value plim2 in accordance with a degree of progress of gear shifting and restriction value plim3 in accordance only with temperature TB are also employed.

When a difference in rotation speed of motor generator MG2 (MG1) between before and after gear shifting in transmission 30 is large, a rate of change in power of motor generator MG2 (MG1) can be abrupt. Therefore, as described above, such a situation that electric power input to and output from electric power storage device 56 exceeds allowable output electric power Wout and allowable input electric power Win may take place.

Figure 27:
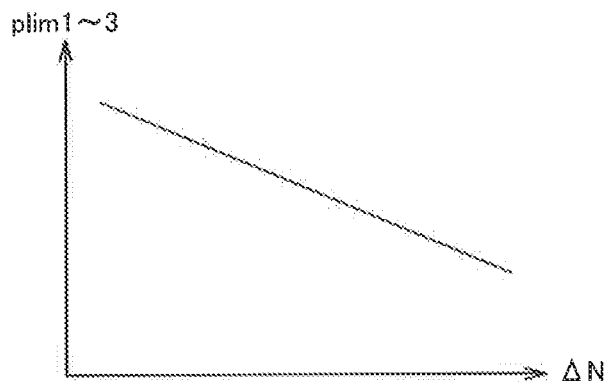
FIG. 27 is a diagram showing relation between a difference in rotation speed of the motor generator between before and after gear shifting and a restriction value for a rate of change in power of the motor generator.

Then, as shown in FIG. 27, excess over allowable output electric power Wout and allowable input electric power Win may be suppressed by correcting restriction values plim1 to plim3 in accordance with a difference $\Delta N$ in rotation speed of motor generator MG2 (MG1) between before and after gear shifting such that restriction values plim3 for the rate of change in power of motor generator MG2 (MG1) are smaller as difference $\Delta N$ in rotation speed of motor generator MG2 (MG1) between before and after gear shifting is greater.

Regarding correction of restriction values plim1 to plim3, the restriction value while difference $\Delta N$ in rotation speed is great should only be smaller than the restriction value while difference $\Delta N$ in rotation speed is small. Namely, as shown in FIG. 27, without being limited to the case that the restriction value is smaller as difference $\Delta N$ in rotation speed is greater as shown in FIG. 27, for example, the restriction value may intermittently decrease as difference $\Delta N$ in rotation speed is greater. In a region where difference $\Delta N$ in rotation speed is smaller than a certain value, the restriction value may be smaller as difference $\Delta N$ in rotation speed is greater and may thereafter be constant. Alternatively, in a region where difference $\Delta N$ in rotation speed is smaller than a certain value, the restriction value may be constant and the restriction value may thereafter be smaller as difference $\Delta N$ in rotation speed is greater.

In a specific technique in this second modification, for example, in steps S240, S270, and S272 in FIG. 26, calculated restriction values plim1 to plim3 should only be corrected in accordance with a difference in rotation speed of motor generator MG2 (MG1) between before and after gear shifting.

Figure 28:
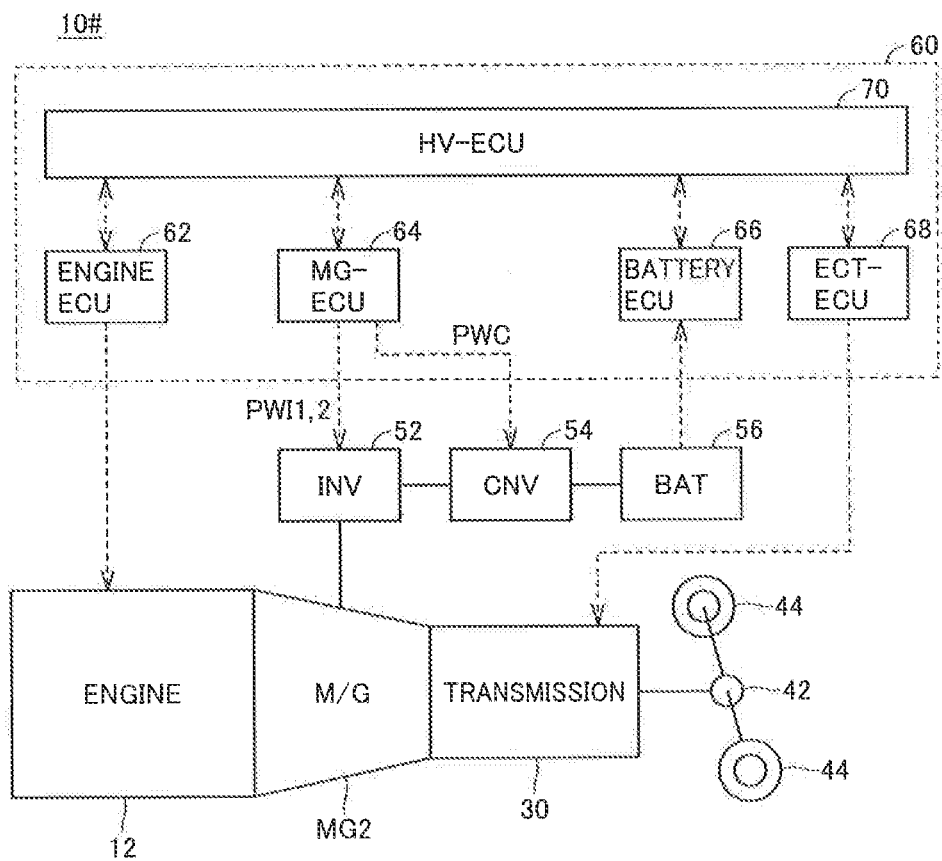
FIG. 28 is a diagram showing another configuration of an electrically powered vehicle.

Though hybrid vehicle 10 including differential portion 20 including two motor generators MG1 and MG2 has been described by way of example of an electrically powered vehicle in each embodiment and each modification above, the electrically powered vehicle to which this invention is applied is not limited to the hybrid vehicle configured as such. As shown in FIG. 28, a hybrid vehicle 104 including a single motor generator MG2 instead of differential portion 20 may be employed.

Though an automatic transmission including a plurality of friction elements (a clutch and a brake) implements transmission 30 in each embodiment and each modification above, other types of a gear type transmission (an MT type or a dog clutch type) may be employed. A torque converter or a K0 clutch cutting off transmission of motive power may be provided in a powertrain between engine 12 and transmission 30.

Though a hybrid vehicle has been described by way of example of an electrically powered vehicle in each embodiment and each modification above, an electrically powered vehicle to which this invention is applied includes also an electric car on which an engine is not mounted. Namely, the electrically powered vehicle according to the present invention includes general vehicles including an electric system including an inverter and a motor and a transmission provided in a powertrain.

Converter 54 does not have to be provided in the first to fourth embodiments and the first modification.

Motor generators MG1 and MG2 correspond to one example of the "motor" in this invention.

Although the present invention has been described and illustrated in detail, it is clearly understood that the same is by way of illustration and example only and is not to be taken by way of limitation, the scope of the present invention being interpreted by the terms of the appended claims.

What is claimed is:
1. An electrically powered vehicle, comprising:
a motor;
an electric power storage device configured to exchange electric power with said motor;
a gear type transmission provided in a powertrain between a rotation shaft of said motor and a drive wheel; and
a controller configured to control torque of said motor during gear shifting in said transmission,
the controller being configured to set a restriction value for a rate of change in said torque while a temperature of said electric power storage device is low to be smaller than a restriction value for said rate of change while the temperature is high.

2. An electrically powered vehicle, comprising:
a motor;
an electric power storage device configured to exchange electric power with said motor;
a gear type transmission provided in a powertrain between a rotation shaft of said motor and a drive wheel; and
a controller configured to control torque of said motor during gear shifting in said transmission,
the controller being configured to set a restriction value for a rate of change in said torque in a latter half of gear shifting in said transmission to be greater than a restriction value for said rate of change in a first half of the gear shifting.

3. An electrically powered vehicle, comprising:
a motor;
an electric power storage device configured to exchange electric power with said motor;
a gear type transmission provided in a powertrain between a rotation shaft of said motor and a drive wheel; and
a controller configured to control torque of said motor during gear shifting in said transmission,
first restriction and second restriction being provided for a rate of change in said torque,
the controller being further configured to:
set, for said first restriction, a restriction value for said rate of change while a temperature of said electric power storage device is low to be smaller than a restriction value for said rate of change while the temperature is high;
set, for said second restriction, a restriction value for said rate of change in a latter half of gear shifting in said transmission to be greater than a restriction value for said rate of change in a first half of the gear shifting;
control the torque of said motor using said first restriction for the rate of change in said torque when the temperature is lower than a prescribed temperature and when the gear shifting is in the first half; and
control the torque of said motor using said second restriction for the rate of change in said torque when the temperature is lower than said prescribed temperature and when the gear shifting is in the latter half.

4. The electrically powered vehicle according to claim 3, wherein
while the temperature is lower than said prescribed temperature and while the gear shifting is in the latter half, the controller is configured to:
control the torque of said motor using said second restriction for the rate of change in said torque, when a vehicle speed is lower than a prescribed speed and when an accelerator opening is smaller than a prescribed amount; and
control the torque of said motor using said first restriction for the rate of change in said torque, when a vehicle speed is higher than said prescribed speed or when an accelerator opening is greater than said prescribed amount.

5. The electrically powered vehicle according to claim 3, wherein
in a case that said first restriction is employed for the rate of change in said torque when the temperature is lower than the prescribed temperature and when the gear shifting is in the first half,
the controller is configured to set said first restriction such that the restriction value for the rate of change in said torque when a rate of change in rotation speed of said motor is high is greater than the restriction value when the rate of change in said rotation speed is low.

6. An electrically powered vehicle, comprising:
a motor;
an electric power storage device configured to exchange electric power with said motor;
a gear type transmission provided in a powertrain between a rotation shaft of said motor and a drive wheel; and
a controller configured to control power of said motor,
the controller being configured to set a restriction value for a rate of change in said power while a temperature of said electric power storage device is low to be smaller than the restriction value while the temperature is high.

7. An electrically powered vehicle, comprising:
a motor;
a gear type transmission provided in a powertrain between a rotation shaft of said motor and a drive wheel;
a drive device configured to drive said motor;
an electric power storage device;
a voltage converter provided between said drive device and said electric power storage device;
a capacitor provided between said voltage converter and said drive device; and
a controller configured to control power of said motor and a voltage of said capacitor,
the controller being configured to set a restriction value for a rate of change in said power while a voltage of said capacitor is high to be smaller than the restriction value while the voltage is low.

8. The electrically powered vehicle according to claim 7, wherein
the controller is further configured to set the restriction value while a temperature of said electric power storage device is low to be smaller than the restriction value while the temperature is high.

9. The electrically powered vehicle according to claim 7, wherein
first restriction, second restriction, and third restriction are provided for the rate of change in said power, and
the controller is configured to:
set, for said first restriction, the restriction value while a temperature of said electric power storage device is low to be smaller than the restriction value while the temperature is high;
set, for said second restriction, as compared with said first restriction, the restriction value while the voltage of said capacitor is high to be smaller than the restriction value while the voltage is low;

set, for said third restriction, the restriction value in a latter half of gear shifting in said transmission to be greater than the restriction value in a first half of the gear shifting;

control the power of the motor using said second restriction for the rate of change in said power when an accelerator opening is greater than a prescribed amount;

control the power of the motor using said third restriction for the rate of change in said power when the accelerator opening is smaller than said prescribed amount and when a vehicle speed is lower than a prescribed speed; and control the power of the motor using said first restriction for the rate of change in said power when the accelerator opening is smaller than said prescribed amount and when the vehicle speed is higher than said prescribed speed.

10. The electrically powered vehicle according to claim 9, wherein the controller is further configured to determine for each of said first to third restrictions, the restriction value such that the restriction value while a difference between a rotation speed of said motor at start of the gear shifting and said rotation speed at end of the gear shifting is great is smaller than the restriction value while said difference is small.

* * * * *